US012111605B2

(12) United States Patent
Yamaguchi et al.

(10) Patent No.: US 12,111,605 B2
(45) Date of Patent: Oct. 8, 2024

(54) IMAGE FORMING APPARATUS WITH MOVABLE JOINT CAM, AND ROTATOR

(71) Applicant: BROTHER KOGYO KABUSHIKI KAISHA, Nagoya (JP)

(72) Inventors: Wataru Yamaguchi, Nisshin (JP); Daisuke Ishizuka, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/066,742

(22) Filed: Dec. 15, 2022

(65) Prior Publication Data

US 2023/0205127 A1 Jun. 29, 2023

(30) Foreign Application Priority Data

Dec. 28, 2021 (JP) ................................ 2021-214945
Jan. 27, 2022 (JP) ................................ 2022-010951

(51) Int. Cl.
*G03G 21/16* (2006.01)
*G03G 21/18* (2006.01)

(52) U.S. Cl.
CPC ..... *G03G 21/1647* (2013.01); *G03G 21/1619* (2013.01); *G03G 21/1633* (2013.01); *G03G 21/1857* (2013.01)

(58) Field of Classification Search
CPC ........... G03G 21/1619; G03G 21/1633; G03G 21/1647; G03G 21/1685; G03G 21/1857; G03G 2221/1657
See application file for complete search history.

(56) References Cited

U.S. PATENT DOCUMENTS 9,791,804 B2 * 10/2017 Kamimura ......... G03G 21/1647
2016/0091857 A1 * 3/2016 Hashimoto ........ G03G 21/1633
399/117

FOREIGN PATENT DOCUMENTS

JP 2012-177840 A 9/2012

* cited by examiner

*Primary Examiner* — Sophia S Chen
(74) *Attorney, Agent, or Firm* — Merchant & Gould P.C.

(57) ABSTRACT

An image forming apparatus, having a cartridge and a main body, is provided. The cartridge has a cartridge-side coupling to transmit a driving force to a drivable member in the cartridge. The cartridge is detachably attached to the main body. The main body includes a body-side coupling movable between a connecting position, at which the body-side coupling is connected with the cartridge-side coupling, and a separated position, at which the body-side coupling is separated from the cartridge-side coupling; a joint cam movable between a first position, at which the joint cam locates the body-side coupling at the connecting position, and a second position, at which the joint cam locates the body-side coupling at the separated position; and a rotator having a dent. The dent allows entry of an end portion of the joint cam there-into when the joint cam is located at the first position.

20 Claims, 22 Drawing Sheets

IMAGE FORMING APPARATUS WITH MOVABLE JOINT CAM, AND ROTATOR

REFERENCE TO RELATED APPLICATIONS

This application claims priorities under 35 U.S.C. § 119 from Japanese Patent Applications No. 2021-214945, filed on Dec. 28, 2021, and No. 2022-010951, filed on Jan. 27, 2022, the entire subject matters of which are incorporated herein by reference.

BACKGROUND ART

The present disclosure is related to an image forming apparatus.

An image forming apparatus having a main body with a driving device is known. To the main body, a process cartridge may be detachably attached, and the process cartridge may have a cartridge-side coupling, through which a driving force from the driving device may be transmitted to drivable devices arranged in the process cartridge. Meanwhile, the main body of the image forming apparatus may have a body-side coupling, a cam member, and a rotatable member. The body-side coupling may be movable between a connecting position, at which the body-side coupling is connected with the cartridge-side coupling, and a retracted position, at which the body-side coupling is disconnected from the cartridge-side coupling. The cam member may be movable between a first position, at which the cam member locates the body-side coupling at the connecting position, and a second position, at which the cam member locates the body-side coupling at the retracted position. The rotatable member may transmit the driving force from the driving device to the drivable devices in the process cartridge.

The image forming apparatus may have a cover to cover or uncover the main body. The cam member may move between the first position to locate the body-side coupling at the connecting position when the cover is closed and the second position to locate the body-side coupling at the retracted position when the cover is opened.

Moreover, the body-side coupling may have a joint, which is engageable with the cartridge-side coupling, and a flange arranged on an outer circumference of the joint. The cam member may have a first opening, in which the joint of the body-side coupling is located when the body-side coupling is at the retracted position, and a second opening, which is formed continuously with the first opening and in which the joint of the body-side coupling is located when the body-side coupling is at the connecting position.

The first opening may be in a form of an ellipse having a width which is substantially equal to an outer diameter of the joint, and a second opening may be in a round form, of which inner diameter is larger than the outer diameter of the joint. On a circumferential edge of the first opening, a slanting rib may be provided so that the flange of the body-side coupling may collide with the slanting rib and thereby the body-side coupling may move between the connecting position and the retracted position as the cam member moves between the first position and the second position.

Moreover, the process cartridge may contain a photosensitive drum and a developing roller, which is one of the drivable devices in the process cartridge. The developing roller may be movable between a contact position, at which the developing roller contacts the photosensitive drum, and a separate position, at which the developing roller is separated from the photosensitive drum, while the body-side coupling is located at the connecting position.

DESCRIPTION

For allowing the cam member to move between the first position and the second position, the image forming apparatus may need to reserve a movable range for the cam member. Meanwhile, when the main body of the image forming apparatus is downsized, the cam member moving between the first position and the second position may interfere with peripheral parts such as rotatable members. In other words, reserving the movable range for the cam member while downsizing the main body of the image forming apparatus may have been difficult.

The present disclosure is advantageous in that an image forming apparatus, in which a movable range for a cam member is reservable and the cam member may be restrained from interfering with peripheral parts while a main body of the image forming apparatus may be downsized, is provided.

Meanwhile, there may be an occasion that, for example, the cam member moved from the second position toward the first position may stop at a position displaced slightly from the first position, e.g., a position closer to the second position. In such an occasion, while the body-side coupling may be located at the connecting position substantially correctly, the cam member may interfere with the body-side coupling when, for example, the developing roller is moved to separate from the photosensitive drum or when, for another example, the image forming apparatus experiences an unexpected external impact. Accordingly, irregular rotation or vibration may be caused in the cartridge-side coupling, which an image forming quality may be affected undesirably.

In order to restrain the interference between the body-side coupling and the cam member even when the cam member stops at a position displaced from the first position, it may be considered that the second opening is enlarged toward the first opening. However, in order to enlarge the second opening in the round form toward the first opening, it may be necessary to increase the inner diameter of the second opening. Meanwhile, if the opening is enlarged, the body-side coupling may fall off from the second opening easily. Further, an outer circumferential dimension of the cam member may increase, and a volume of the main body of the image forming apparatus may increase.

The present disclosure is therefore advantageous in that an image forming apparatus, in which a body-side coupling may be restrained from colliding with a cam member without causing a body to increase a volume thereof while a quality of image forming is maintained, is provided.

Figure 8A:
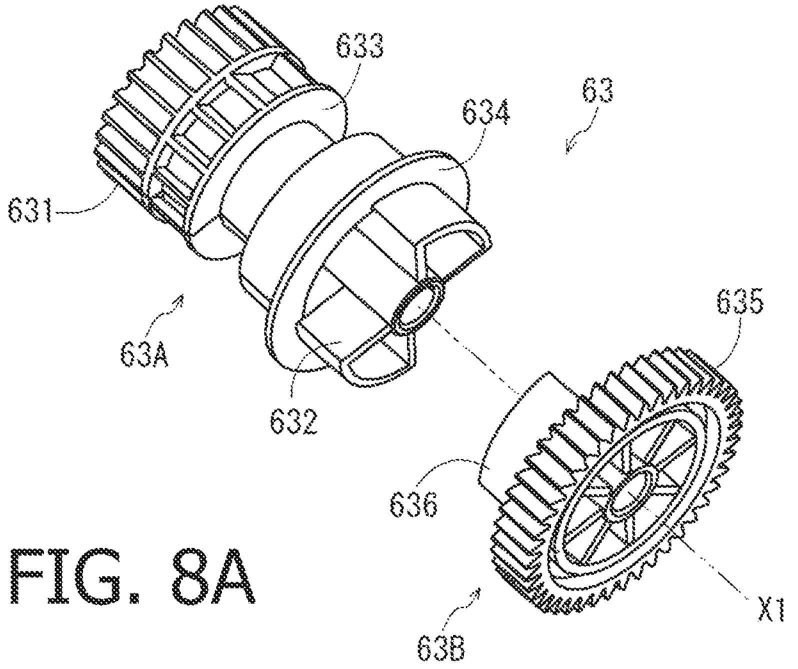
Figure 8B:
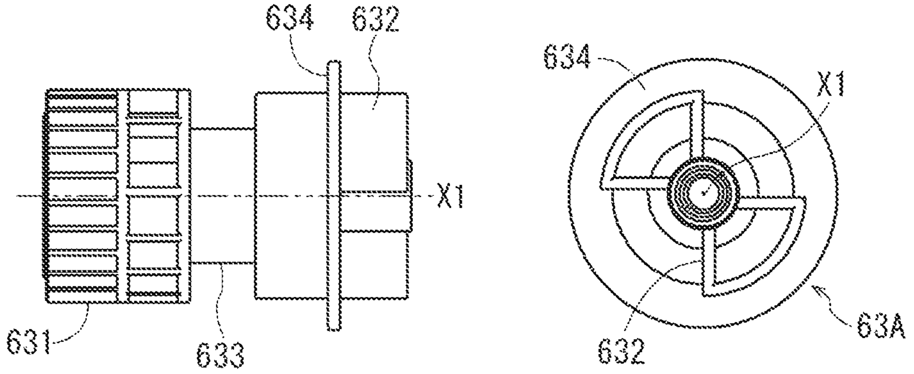
Figure 8C:
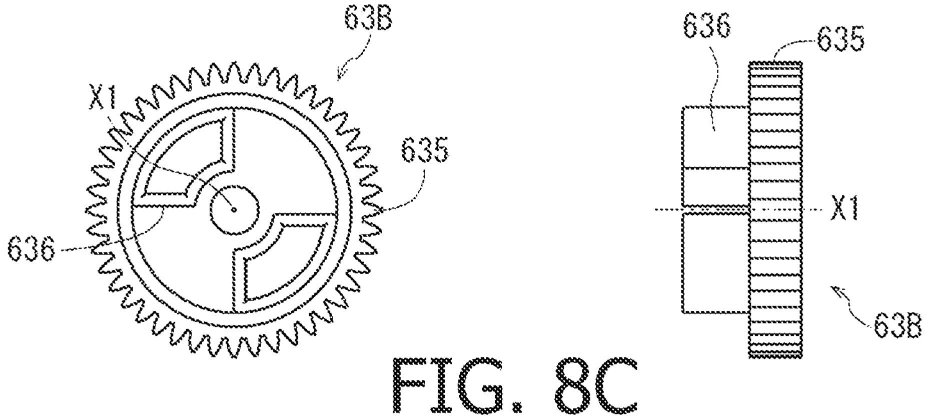

FIG. 8A is an exploded perspective view of the fuser gear. FIG. 8B shows sideward and frontward views of a first part of the fuser gear. FIG. 8C shows frontward and sideward views of a second part of the fuser gear.

Figure 9A:
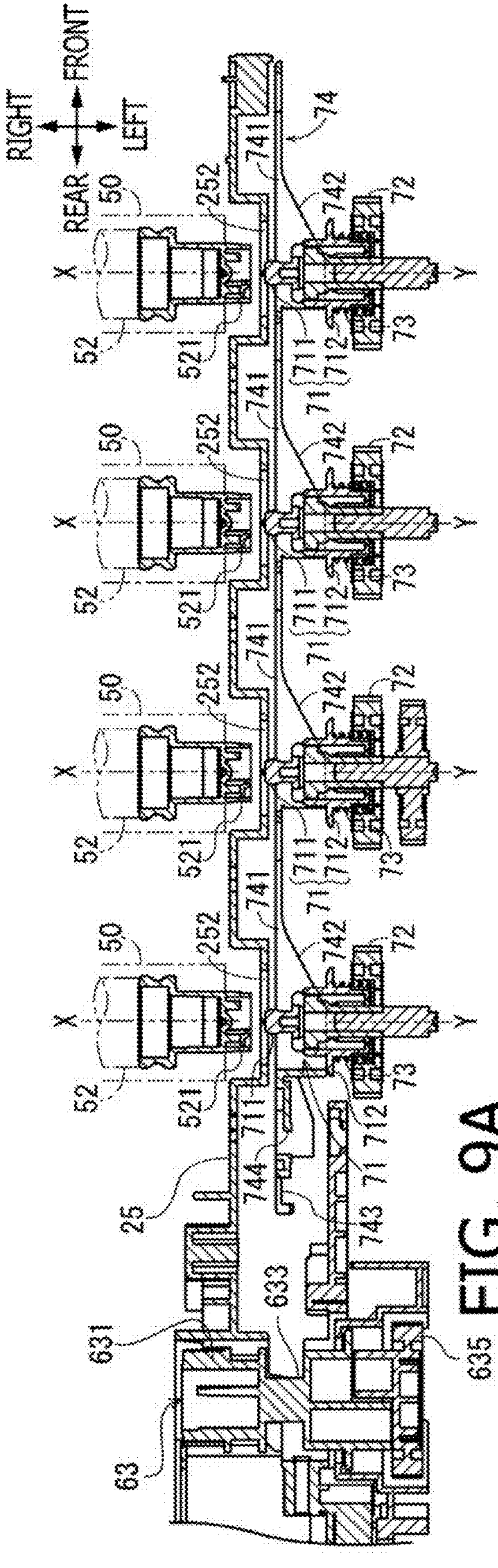
Figure 9B:
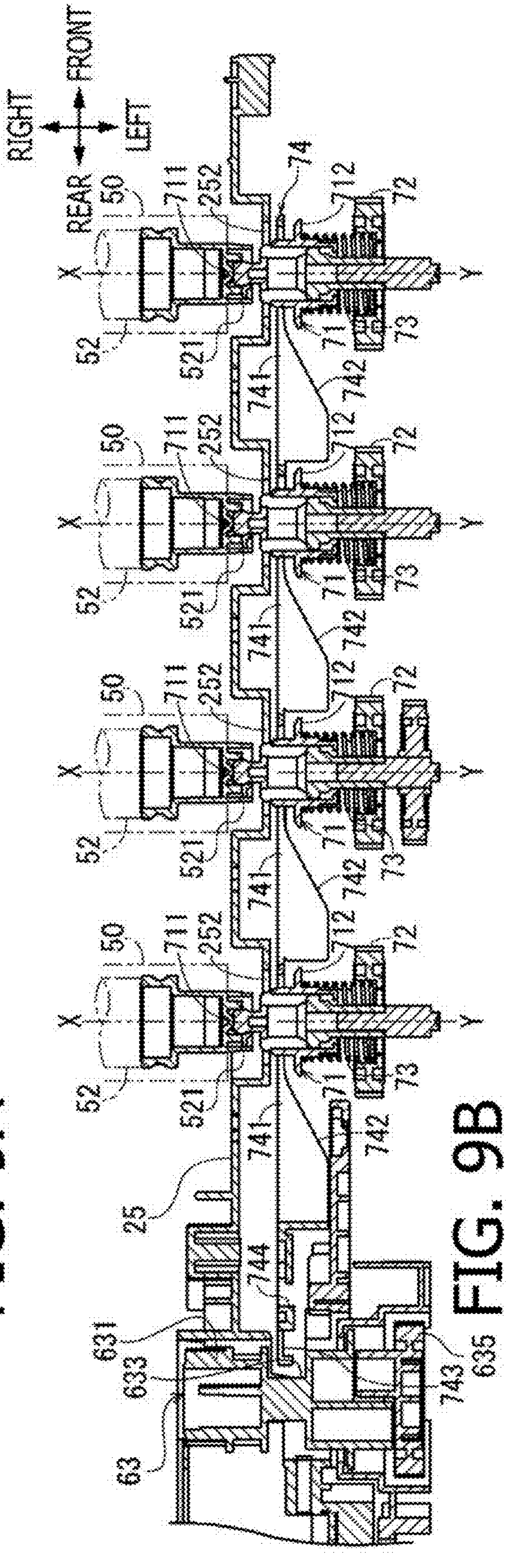

FIG. 9A is a cross-sectional view of body-side couplings located at respective separated positions. FIG. 9B is a cross-sectional view of the body-side couplings located at respective connecting positions.

Figure 10A:
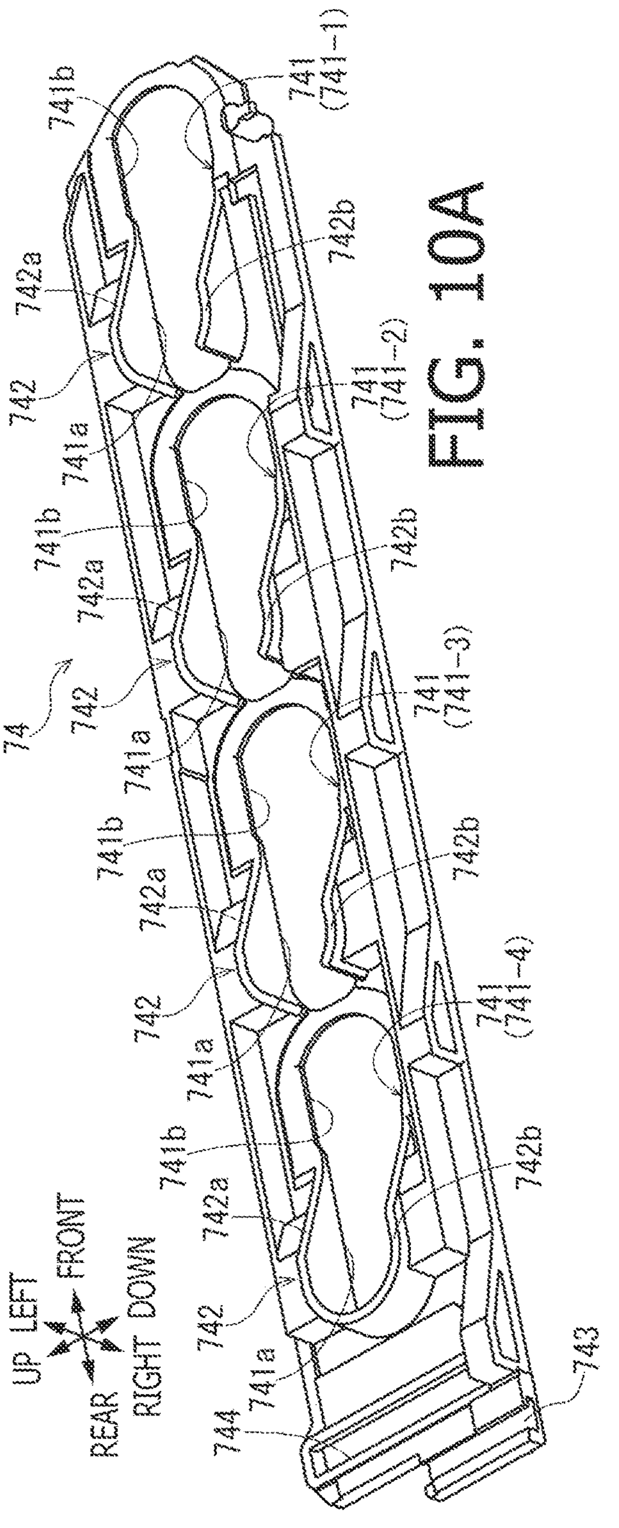
Figure 10B:
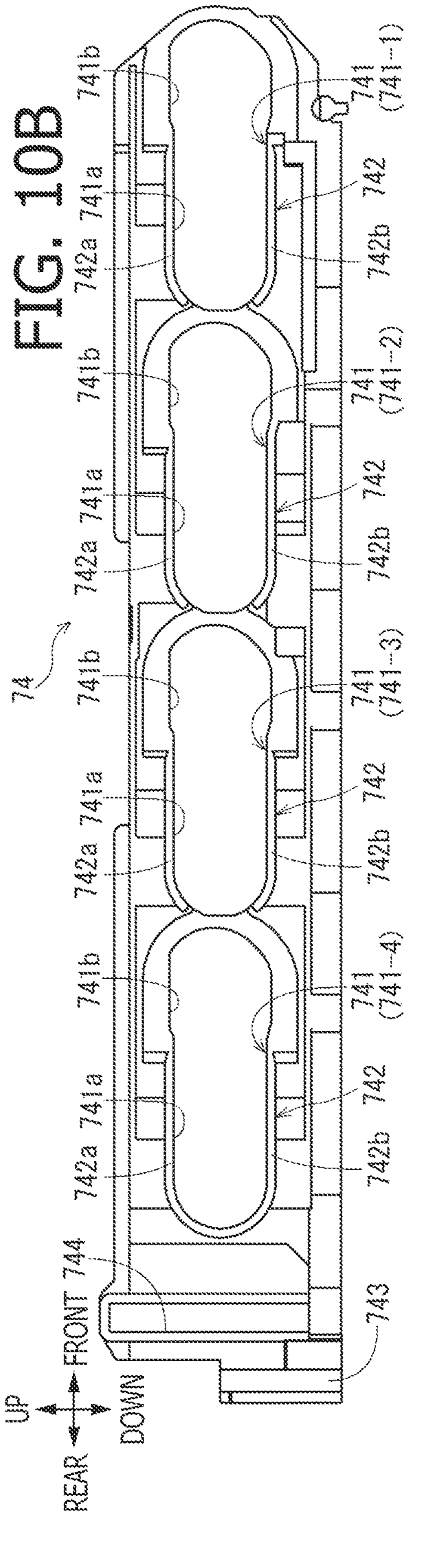

FIG. 10A is a perspective view of a joint cam. FIG. 10B is a sideward view of the joint cam.

Figure 11A:
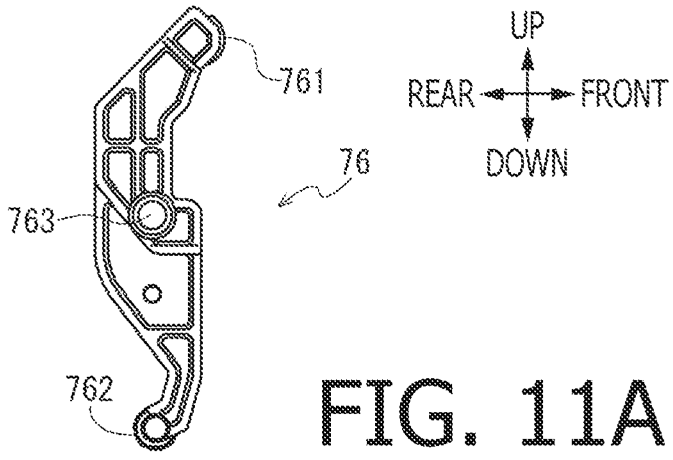
Figure 11B:
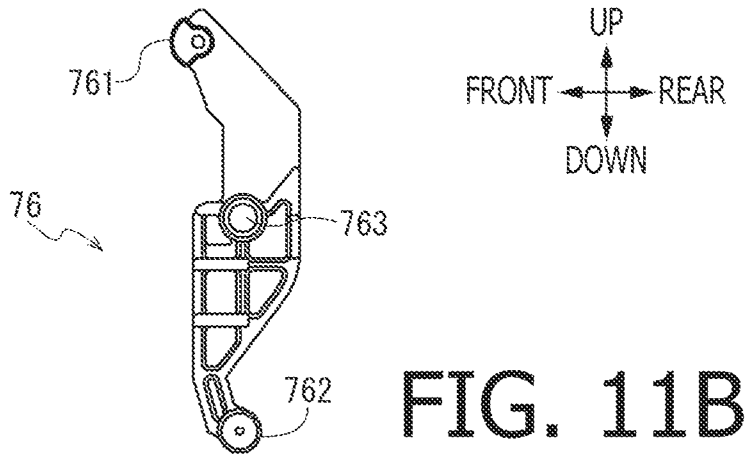
Figure 11C:
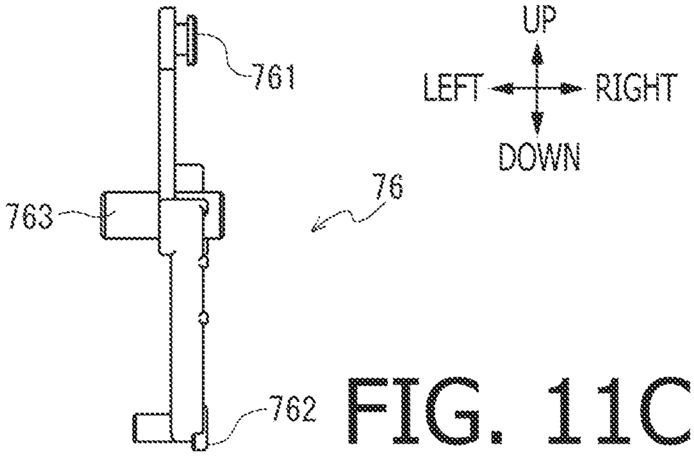

FIG. 11A is a leftward side view of a link. FIG. 11B is a rightward side view of the link. FIG. 11C is a frontward view of the link.

Figure 12:
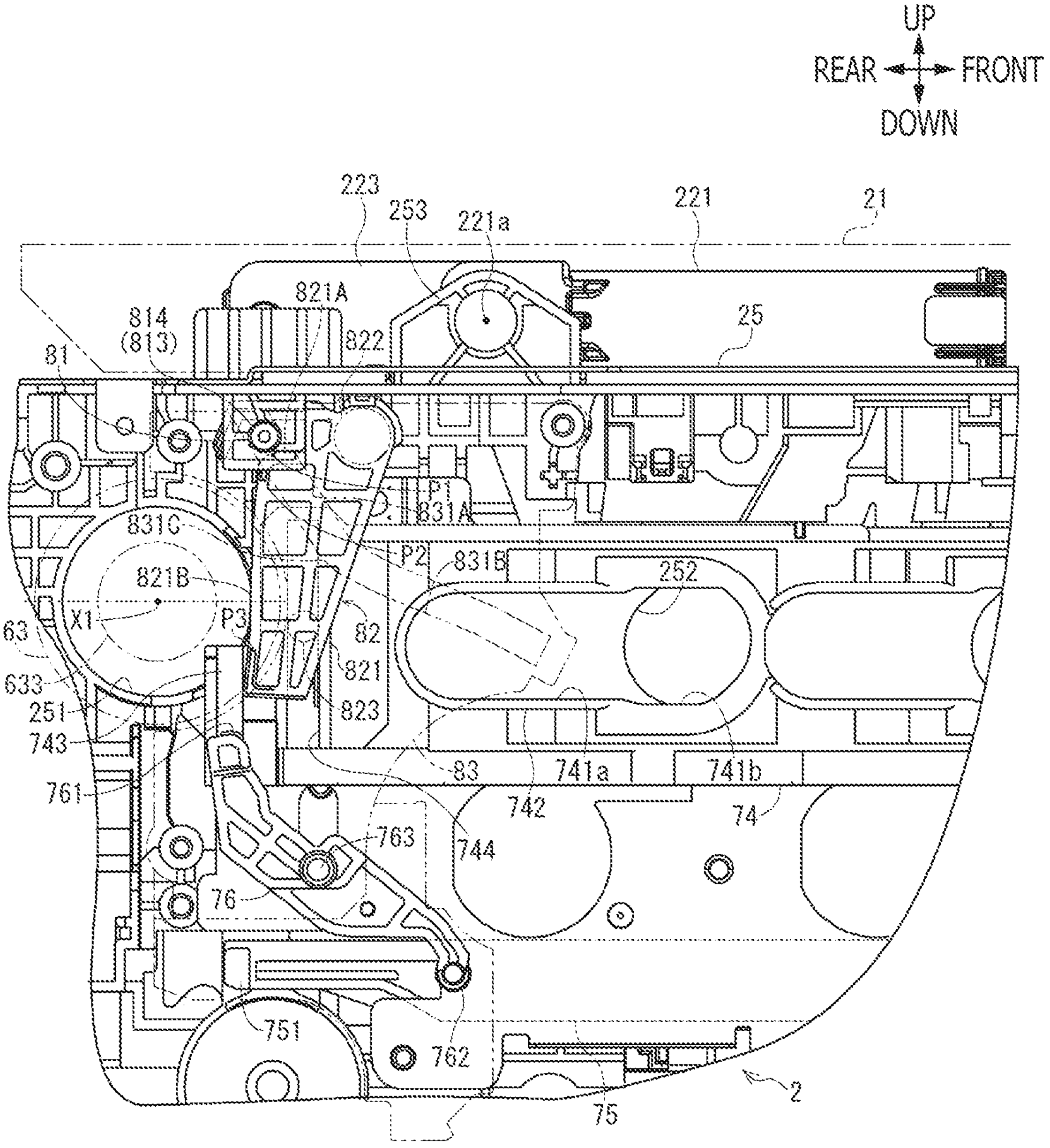

FIG. 12 is a leftward side view of a rearward part of the main body with the top cover located at the closed position.

Figure 13:
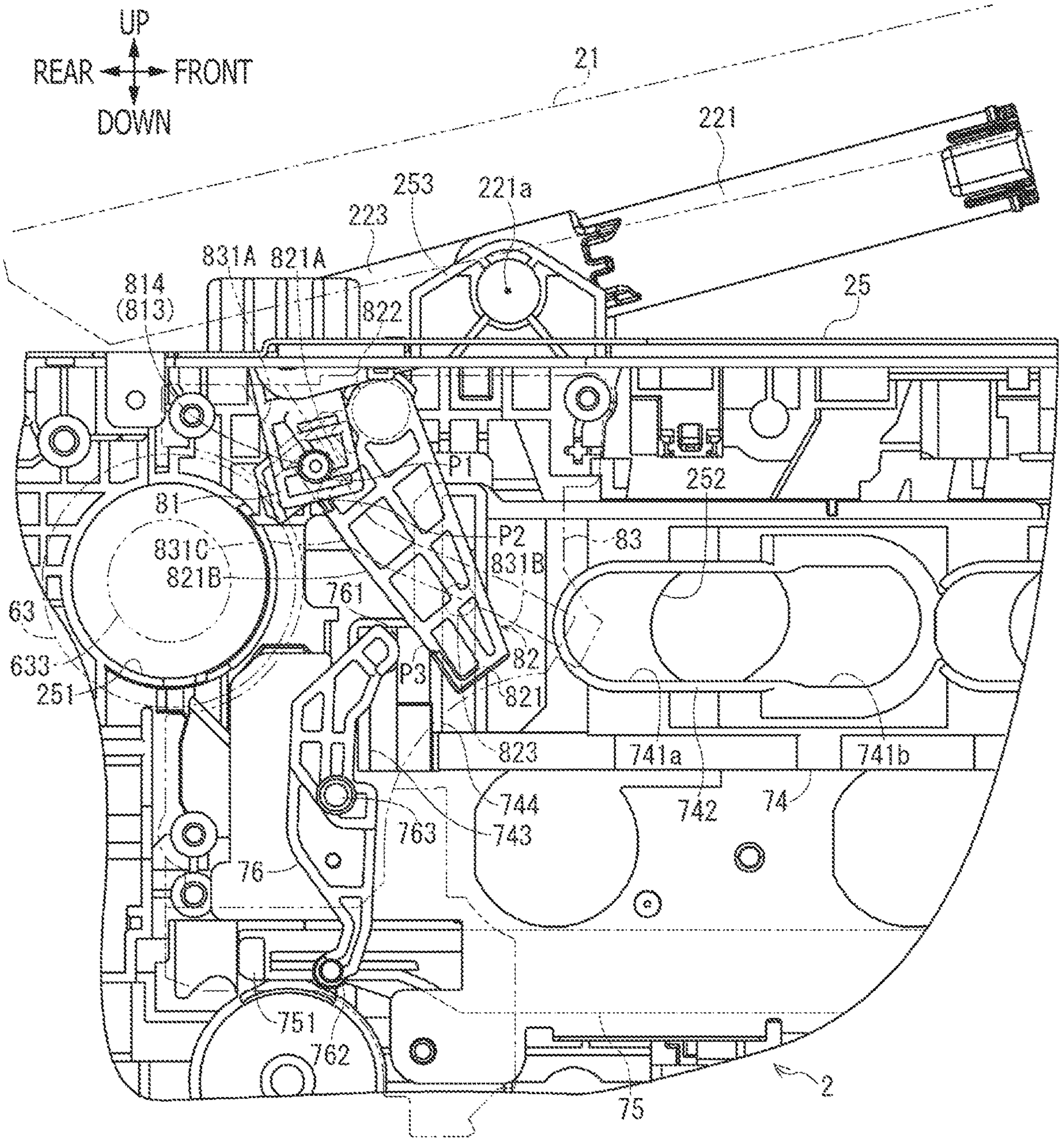

FIG. 13 is a leftward side view of the rearward part of the main body with the joint cam located at a third position between a first position and a second position.

Figure 14:
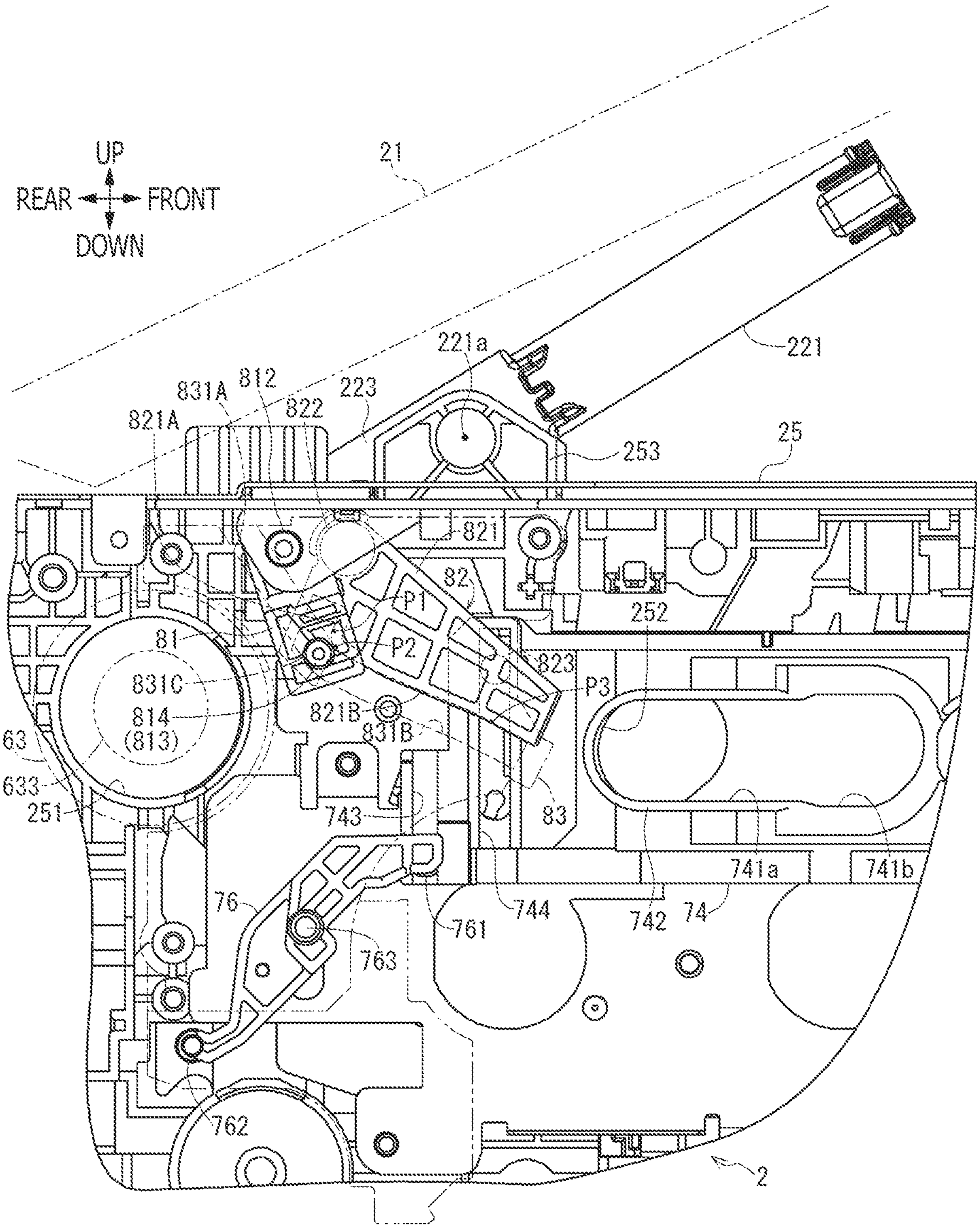

FIG. 14 is a leftward side view of the rearward part of the main body with the top cover located at an intermediate position.

Figure 15:
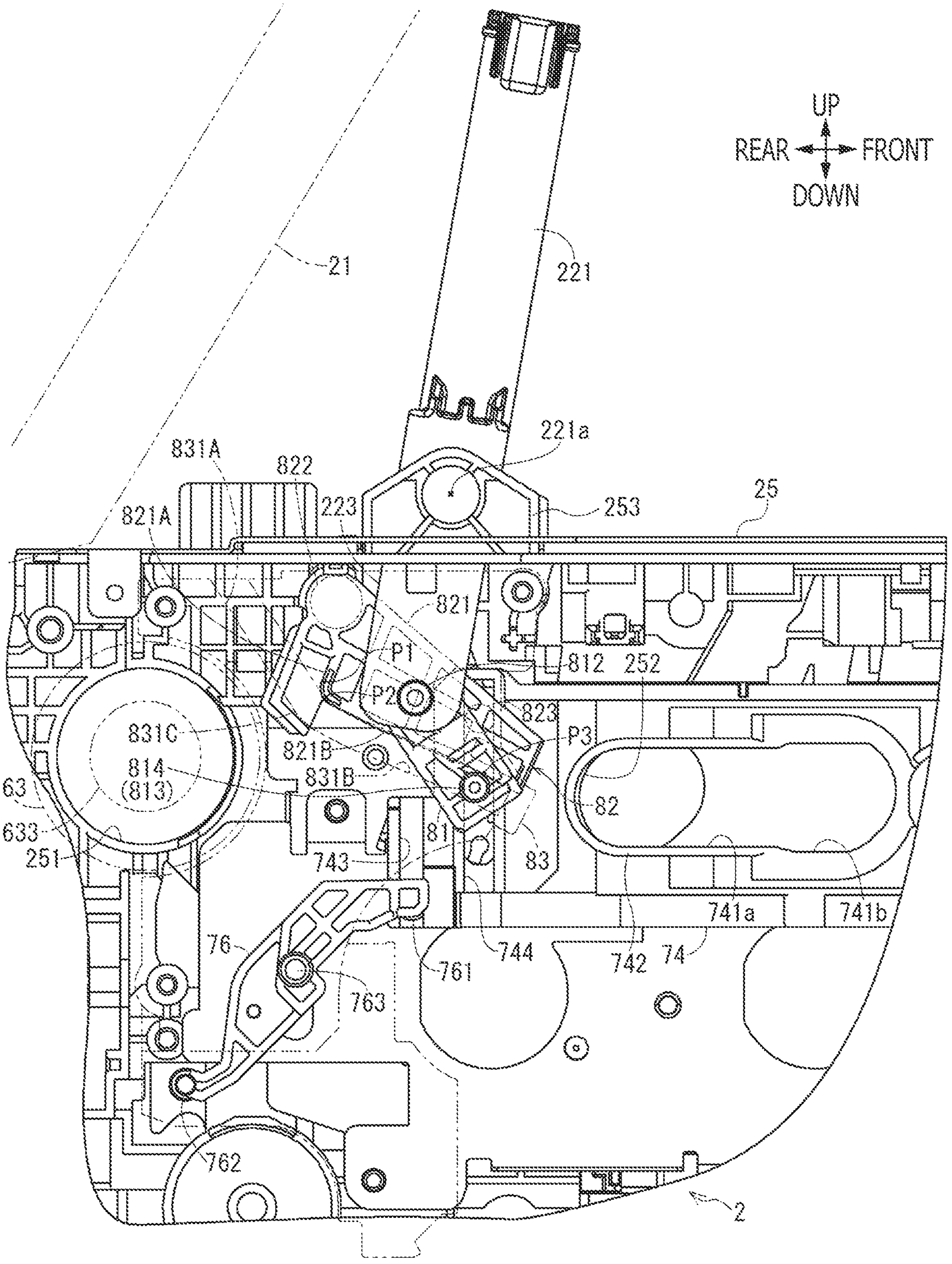

FIG. 15 is a leftward side view of the rearward part of the main body with the top cover located at the open position.

Figure 16A:
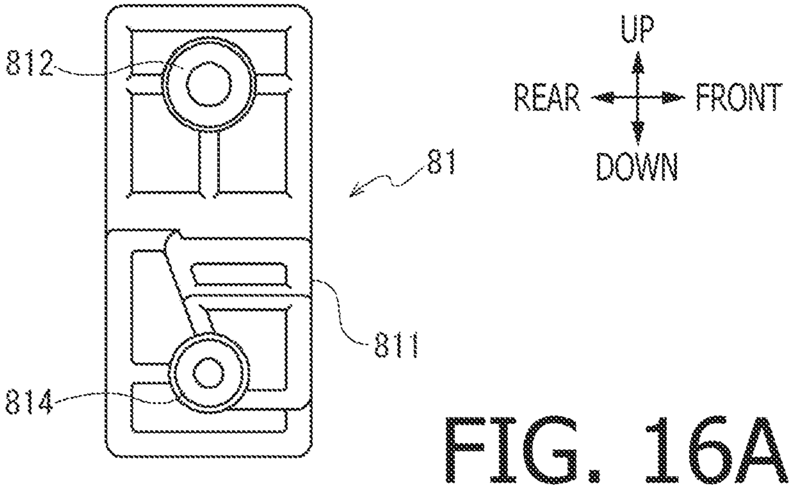
Figure 16B:
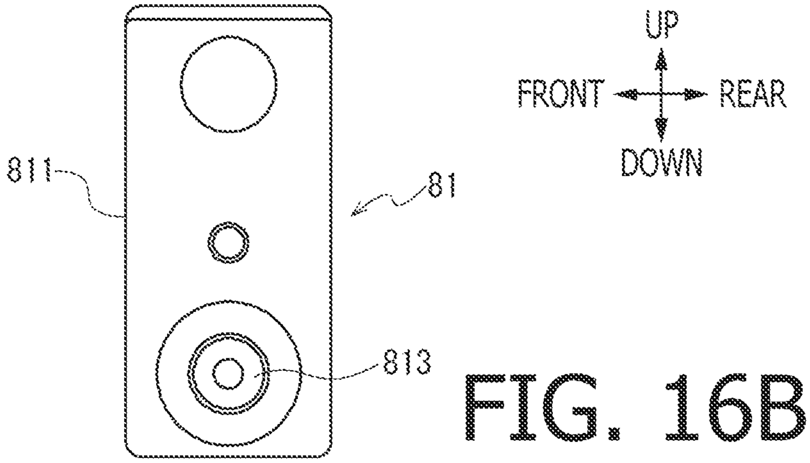
Figure 16C:
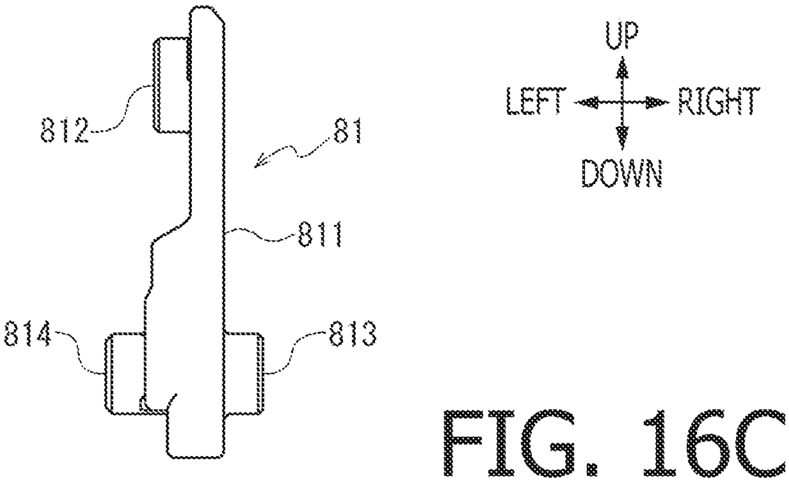

FIG. 16A is a leftward side view of a pressure applier. FIG. 16B is a rightward side view of the pressure applier. FIG. 16C is a frontward view of the pressure applier.

Figure 17:
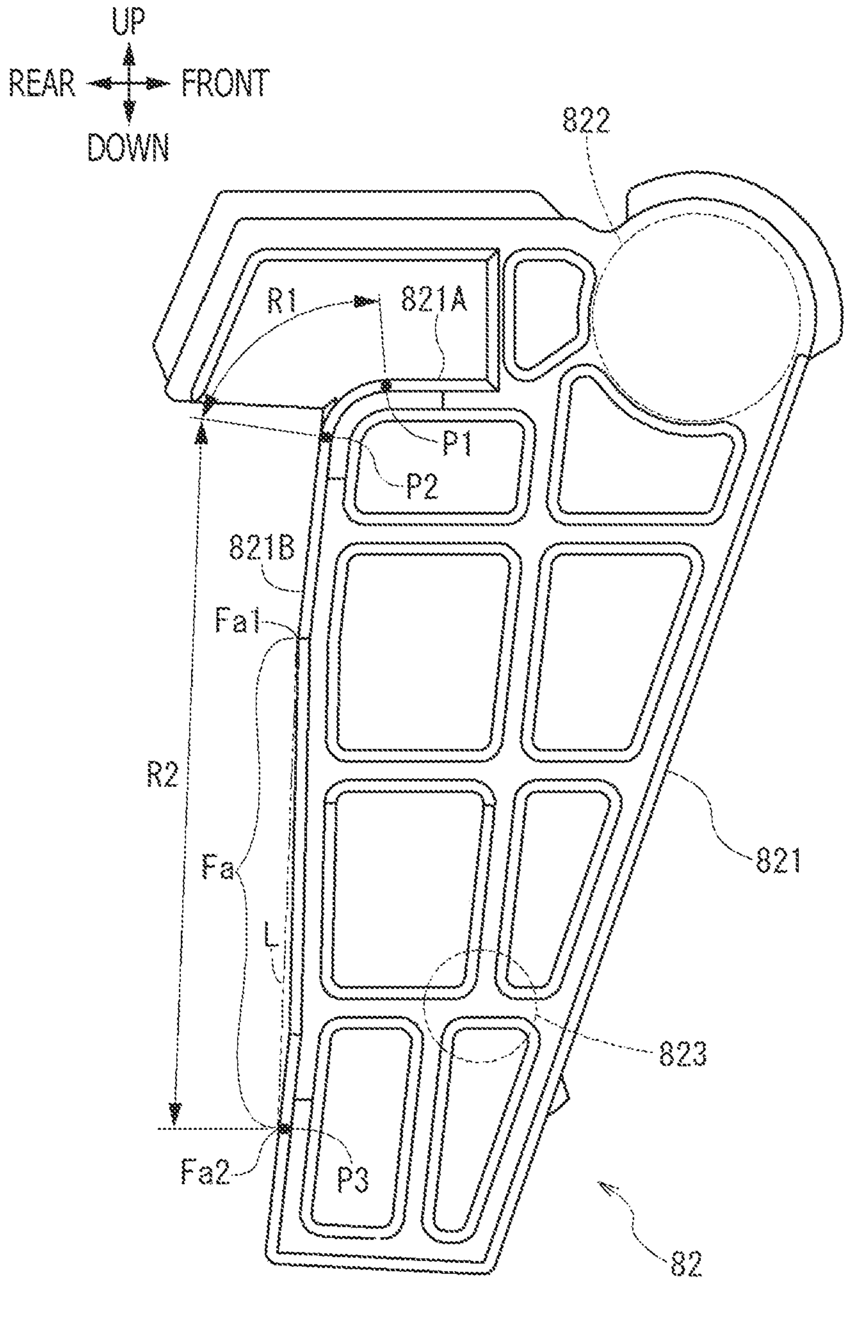

FIG. 17 is a sideward view of a pivotable piece.

Figure 18A:
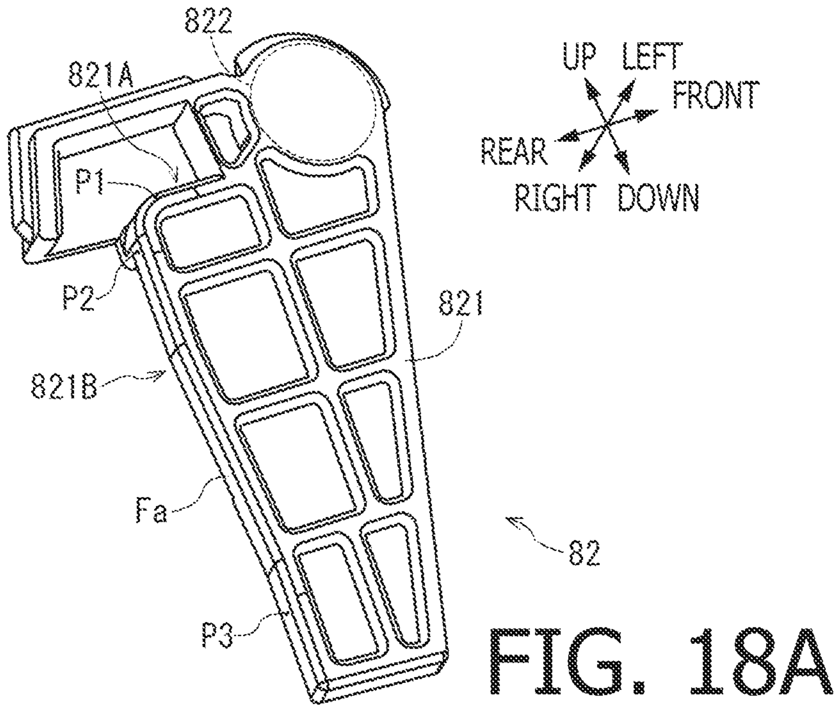
Figure 18B:
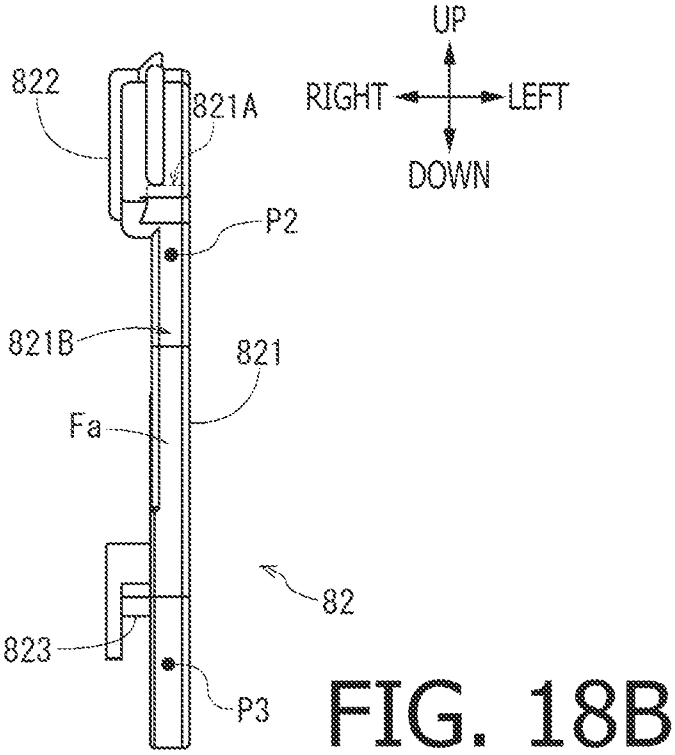

FIG. 18A is a perspective view of the pivotable piece. FIG. 18B is a rearward view of the pivotable piece.

Figure 19:
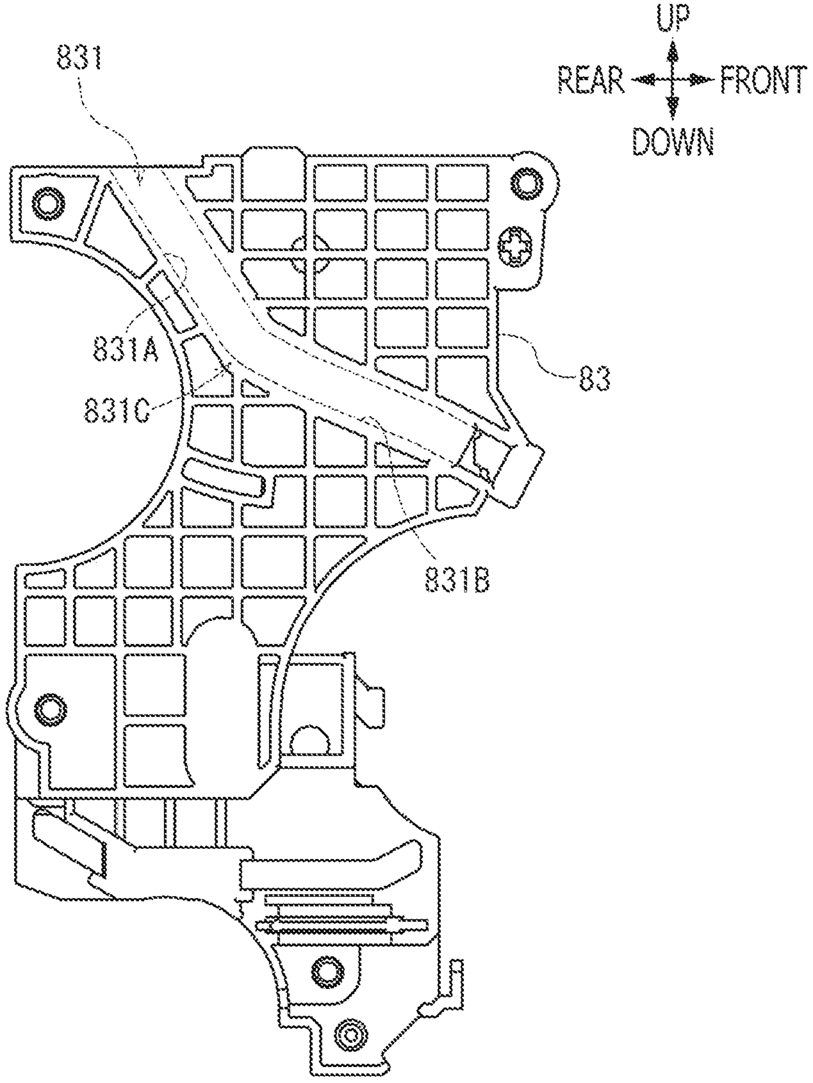

FIG. 19 is a sideward view of a profile member.

Figure 20:
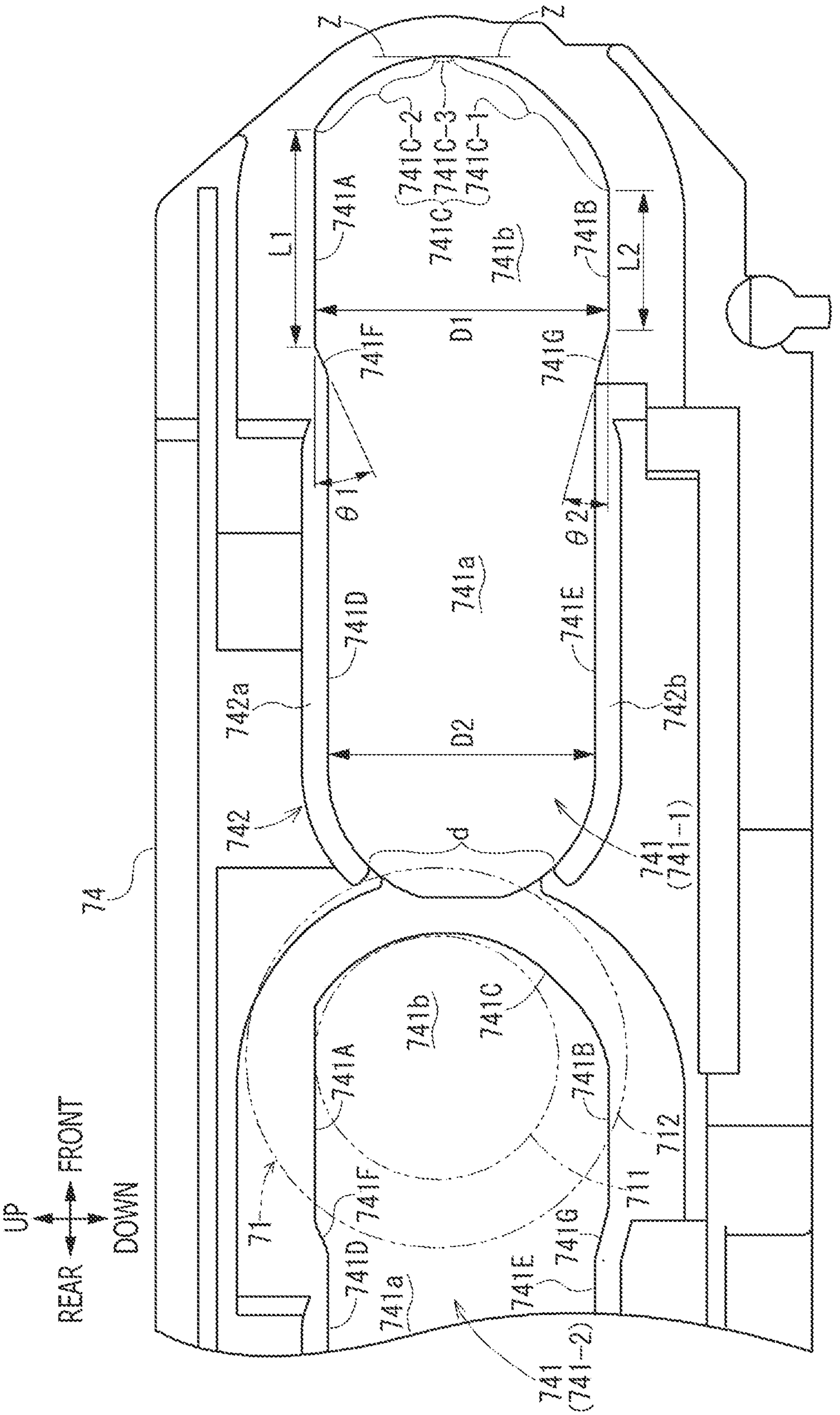

FIG. 20 is a sideward partial view the joint cam with openings.

Figure 21A:
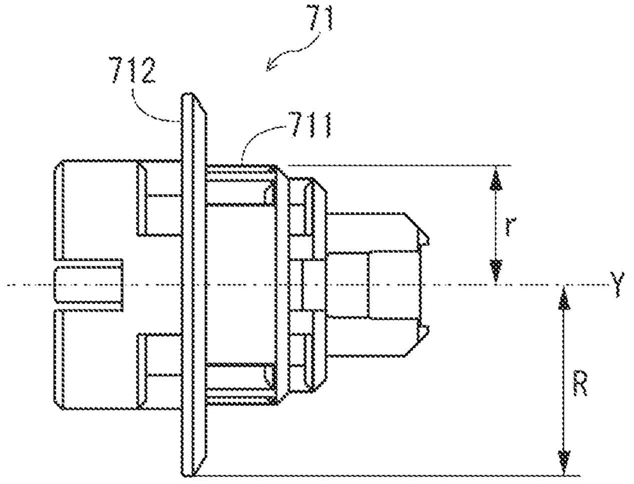
Figure 21B:
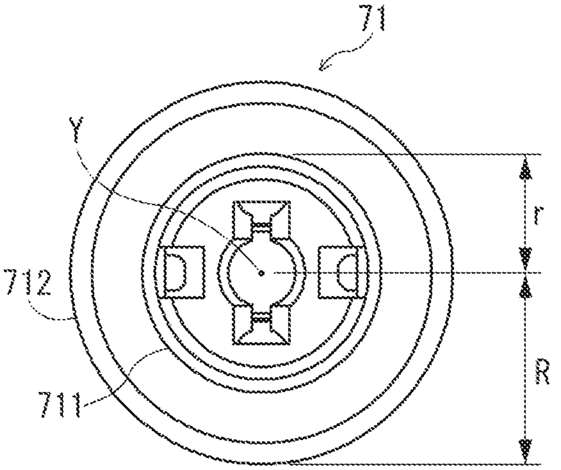

FIGS. 21A-21B illustrate radii of the joint cam and a flange.

Figure 22A:
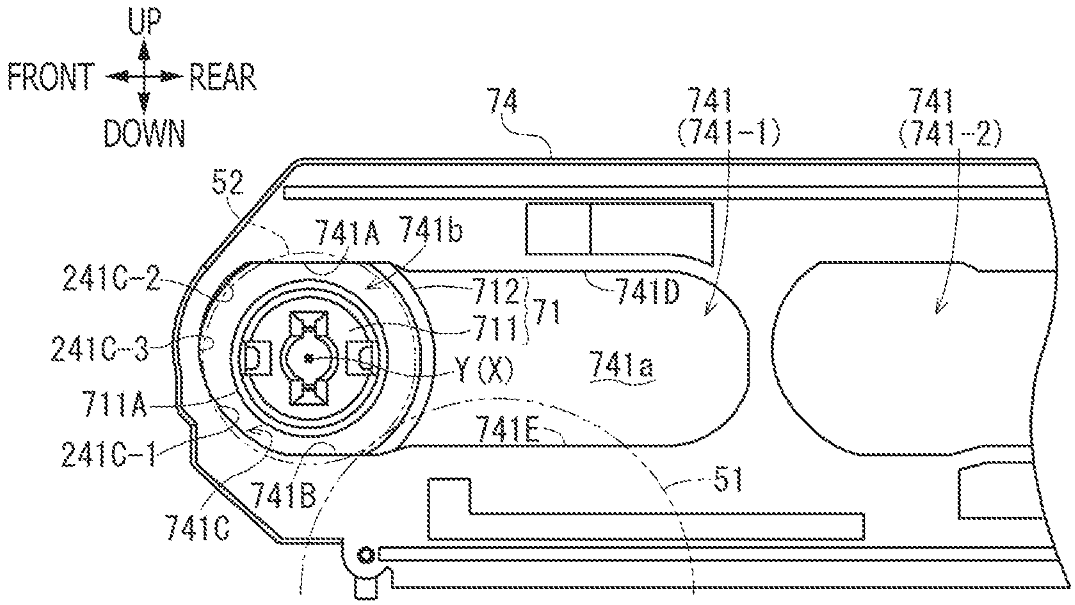
Figure 22B:
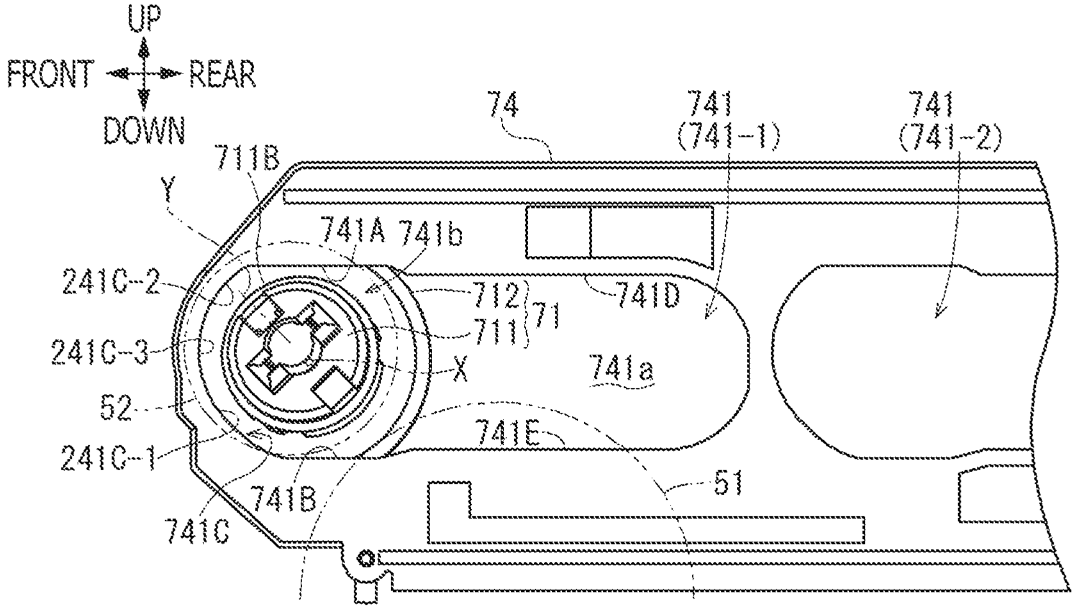

FIG. 22A is a side view of a joint located at a third position in a second opening. FIG. 22B is a side view of the joint located at a fourth position in the second opening.

Hereinafter, an embodiment of the present disclosure will be described with reference to the accompanying drawings.

Image Forming Apparatus

Figure 1:
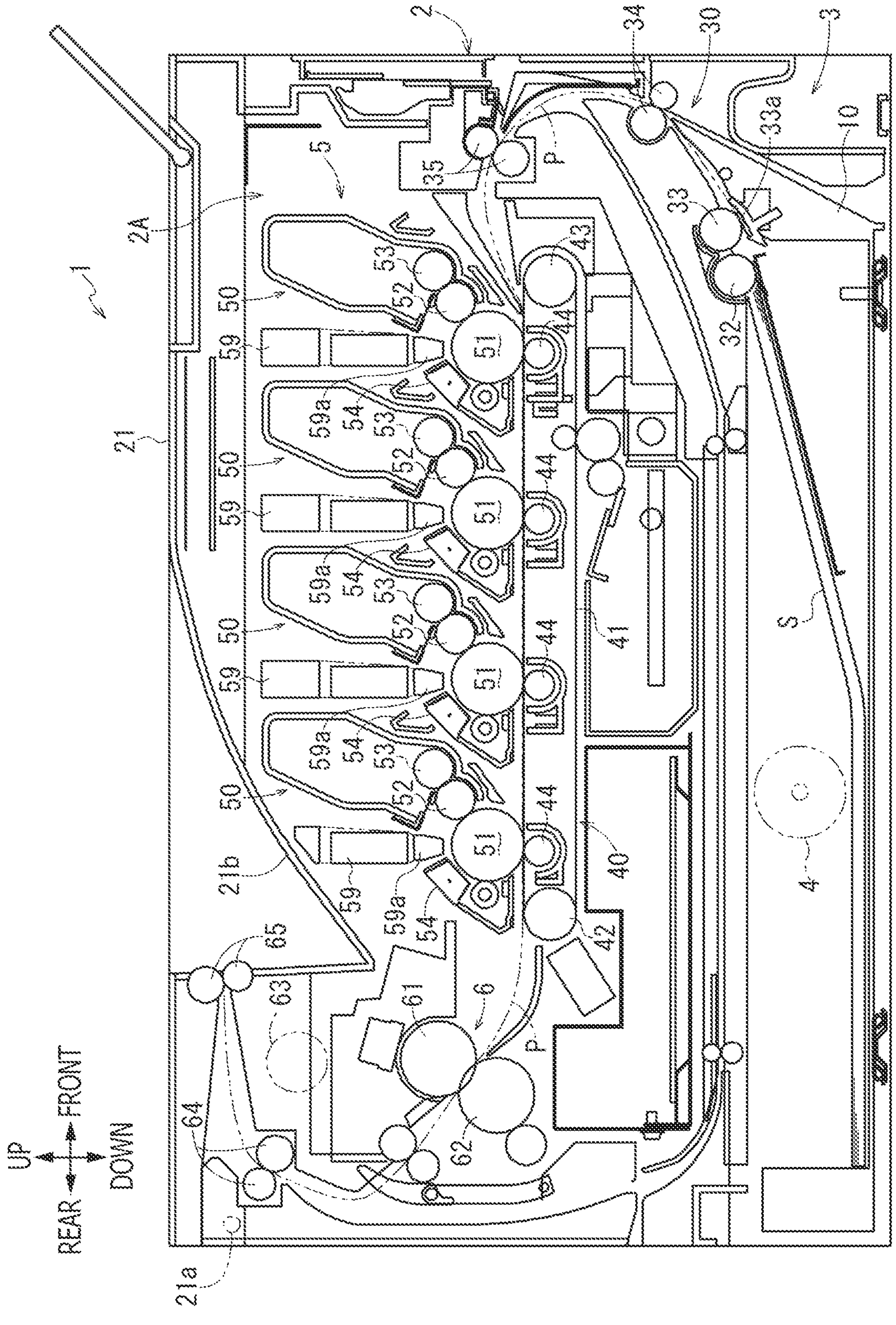
FIG. 1 is a cross-sectional view of an image forming apparatus.
Figure 2:
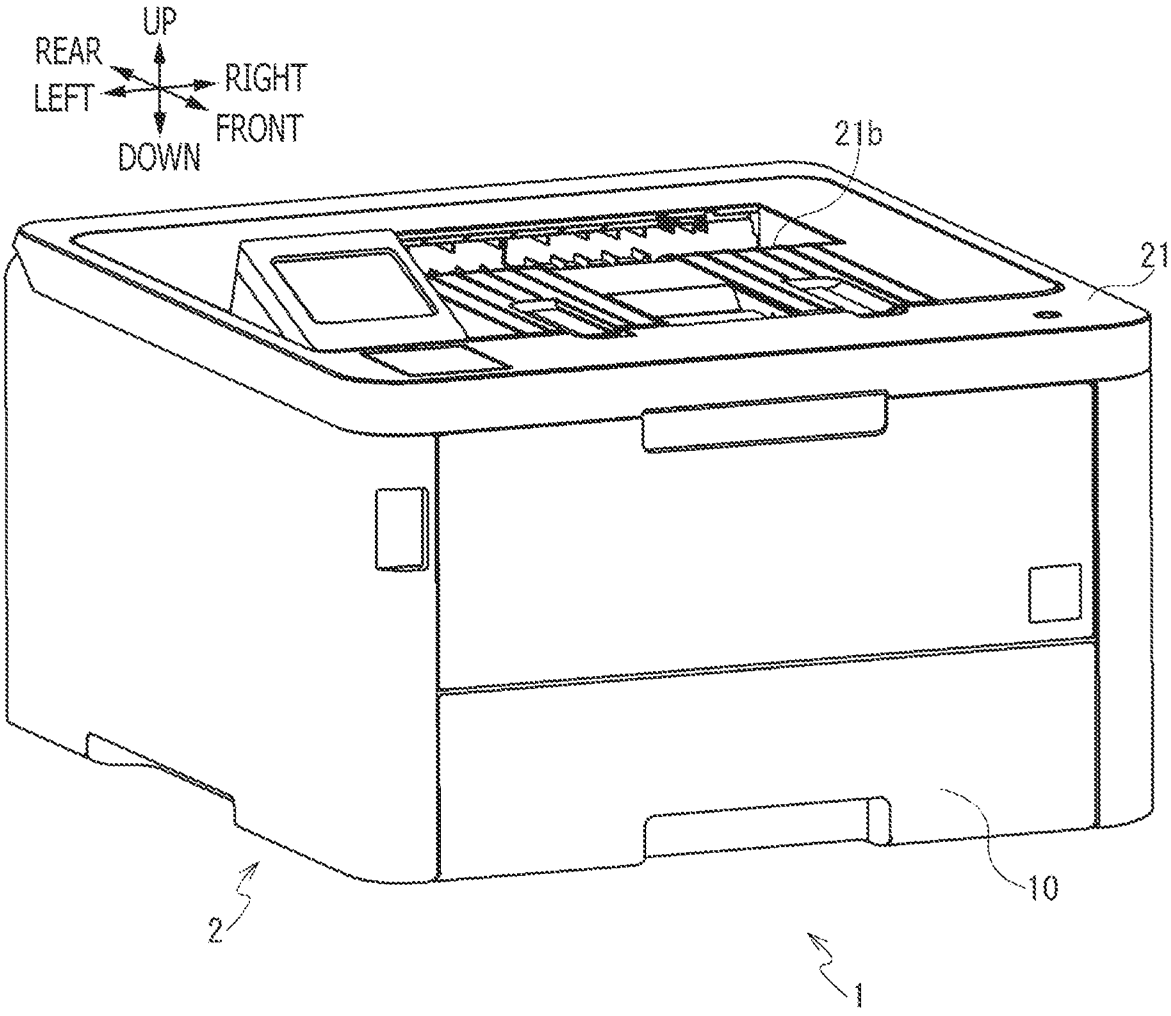
FIG. 2 is a perspective view of the image forming apparatus with a top cover located at a closed position.
Figure 3:
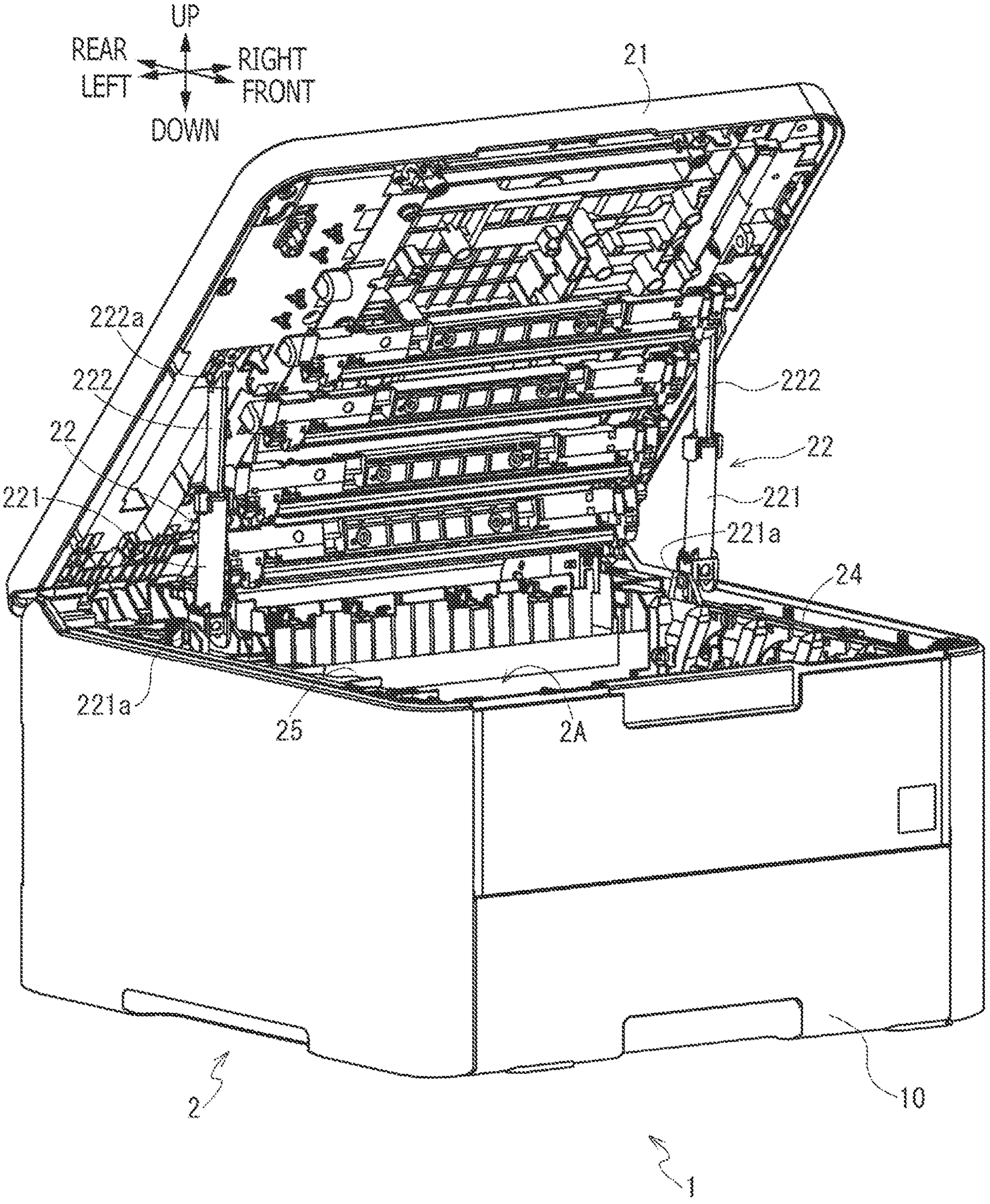
FIG. 3 is a perspective view of the image forming apparatus with the top cover located at an open position.

An image forming apparatus 1 according to an embodiment as shown in FIGS. 1-3 may be a color laser printer that may form a multicolored image electro-photographically on a sheet S.

In the following description, a right-hand side and a left-hand side in FIG. 1 to a viewer will be defined as a front side and a rear side, respectively, of the image forming apparatus 1, and a nearer side and a farther side to the viewer with respect to a cross section in FIG. 1 will be defined as a leftward side and a rightward side, respectively, of the image forming apparatus 1. An upper side and a lower side in FIG. 1 will be defined as an upper side and a lower side, respectively, of the image forming apparatus 1. A front-to-rear or rear-to-front direction may be called as a front-rear direction, a left-to-right or right-to-left direction may be called as a widthwise direction, and an up-to-down or down-to-up direction may be called as a vertical direction.

The image forming apparatus 1 includes a main body 2, a feeder 3, an image forming device 5, and a fuser 6. The feeder 3 includes a feeder tray 10 to support sheets S and a sheet conveyer 30 to convey the sheets S. The image forming device 5 may form images in toners on a sheet S conveyed from the sheets S in the feeder 3. The fuser 6 may fuse and fix the toner images onto the sheet S.

The main body 2 may have a substantially rectangular boxed form and accommodate components including the feeder 3, the image forming device 5, the fuser 6, and a motor 4. The main body 2 has an opening 2A on an upper side thereof, and the image forming apparatus 1 has a top cover 21 which may open or close the opening 2A of the main body 2.

The top cover 21 is pivotably supported by the main body 2 to pivot on a pivot axis 21*a*, which is located at a rearward end of the main body 2. The top cover 21 is pivotable on the pivot axis 21*a* to move between a closed position (see FIG. 2), at which the top cover 21 closes the opening 2A, and an open position (see FIG. 3), at which the top cover 21 opens the opening 2A. The top cover 21 is formed to have an ejection tray 21*b*, which slants to be lower toward the rear side.

As shown in FIG. 3, a damper 22 is interposed between the top cover 21 and the main body 2. The damper 22 is located at each widthwise end of the image forming apparatus 1. The damper 22 includes a cylinder 221 and a piston 222. The cylinder 221 is pivotably supported by the main body 2 to pivot on a support point 221*a*. The piston 222 is expandable or contractable with respect to the cylinder 221 and is pivotably supported by the top cover 21 to pivot on a support point 222*a*.

With the dampers 22 interposed between the top cover 21 and the main body 2, the top cover 21 may be opened or closed with a reduced amount of force, and the top cover 21 may be restrained from closing abruptly.

The feeder 3 is located at a lower position in the main body 2. The feeder 3 has the sheet conveyer 30 to convey the sheets S supported by the feeder tray 10 to the image forming device 5. The feeder tray 10 is slidable in the front-rear direction and is movable between a stowed position, at which the feeder tray 10 is stowed in the main body 2, and a separated position, at which the feeder tray 10 is pulled frontward from the stowed position.

The sheet conveyer 30 includes a feeder roller 32, a separator roller 33, a separator pad 33*a*, a conveyer roller pair 34, and a registration roller pair 35. Inside the main body 2, a conveyer path P is formed, and the sheets S may be conveyed in the conveyer path P. The conveyer path P extends from the feeder tray 10 through the image forming device 5 to the ejection tray 21*b*.

The sheets S supported by the feeder tray 10 may be separated from one another by the feeder roller 32, the separator roller 33, and the separator pad 33*a* and fed to the conveyer path P one by one. The feeder roller 32 may convey the sheets S from the feeder tray 10 toward the image forming device 5. The separator roller 33 and the separator pad 33*a* may separate one of the sheets S supported by the feeder tray 10 from the other sheets S.

The sheet S fed to the conveyer path P may be conveyed by the conveyer roller pair 34 and the registration roller pair 35 toward the image forming device 5 and may hit the registration roller pair 35. The registration roller pair 35 hit by a frontward edge of the sheet S may restrict the sheet S from moving in the conveyer path P temporarily and, after a pause, convey the sheet S to the image forming device 5 at predetermined timing.

The image forming device 5 is located above the feeder 3 and includes at least one process cartridge 50. For example, the image forming device 5 may include four (4) process cartridges 50, which are arranged along the front-rear direction. The process cartridges 50 are provided to correspond to colors of black, yellow, magenta, and cyan on one-to-one basis. The process cartridges 50 are detachably attached to the main body 2. Each of the process cartridges 50 includes a photosensitive drum 51, a developing roller 52, a supplier roller 53, and a charger 54. Each process cartridge 50 includes a drum cartridge containing the photosensitive drum 51 and a developing cartridge containing the developing roller 52.

The process cartridges 50 may each be attached to the main body 2 in a posture, in which an axis X of the developing roller 52 aligns with the widthwise direction (see FIGS. 9A-9B). The developing roller 52 is movable between a contact position, at which the developing roller 52 contacts the photosensitive drum 51, and a separate position, at which the developing roller 52 is separated from the photosensitive drum 51. The supplier roller 53 may supply toner contained in the process cartridge 50 to the developing roller 52.

The main body 2 includes exposure heads 59 that may emit beams at surfaces of the photosensitive drums 51. The exposure heads 59 are supported by the top cover 21. The exposure heads 59 are provided to correspond to the photosensitive drums 51 on one-on-one basis and are arranged to align in the front-rear direction. The exposure heads 59 extend downward from the top cover 21 and have exposure devices 59*a* at lower ends thereof. The exposure devices 59*a* are, when the top cover 21 is closed, located at positions above and adjacent to the photosensitive drums 51. Each exposure device 59*a* includes an LED array, in which a plurality of LED devices are arranged along the widthwise direction.

At a position below the photosensitive drums 51 across the conveyer path P, a transfer belt 41 is arranged to face the photosensitive drums 51. The transfer belt 41 is strained around a driving roller 42 and a driven roller 43 which is located frontward with respect to the driving roller 42. The transfer belt 41, the driving roller 42, and the driven roller 43 form a belt assembly 40. At positions to face the photosensitive drums 51 across the transfer belt 41, transfer rollers 44 are arranged.

In the image forming device 5, chargers 54 to charge the surfaces of the photosensitive drums 51 are arranged. The chargers 54 and the photosensitive drums 51 are arranged on on-on-one basis. The photosensitive drums 51 charged evenly by the respective chargers 54 may be selectively exposed to beams emitted from the exposure heads 59. The beams may remove charges on the surfaces of the photosensitive drums 51 in the selectively exposed areas; thereby, electrostatic latent images may be formed on the surfaces of the photosensitive drums 51.

The toners stored in the process cartridges 50 may each be charged positively by friction between the supplier roller 53 and the developing roller 52 and carried on a surface of the developing roller 52. To each developing roller 52, developing bias is applied, and when the electrostatic latent image formed on the photosensitive drum 51 comes to face the developing roller 52, due to the difference in potentials between the electrostatic latent image and the developing roller 52, the toner may be supplied from the developing roller 52 to the electrostatic latent image. Thereby, toner images may be formed on the surfaces of the photosensitive drums 51.

As the sheet S conveyed by the sheet conveyer 30 toward the image forming device 5 reaches the transfer belt 41, the sheet S may ride on the transfer belt 41 and may be conveyed through positions between the transfer belt 41 and the photosensitive drums 51. When the sheet S faces the photosensitive drums 51 one after another, the toner images on the surfaces of the photosensitive drums 51 may be transferred to the sheet S through the transfer bias applied to the transfer rollers 44.

It may be noted that the transfer belt 41, which may convey the sheet S, and on which the toner images may be transferred to the sheet S being conveyed, may optionally be replaced with an intermediate transfer belt, to which the toner images may be transferred, and the toner images may be further transferred therefrom to the sheet S.

The sheet S with the toner images transferred thereon may be conveyed to the fuser 6. The fuser 6 includes a heat roller 61 and a pressure roller 62 urged against the heat roller 61. The heat roller 61 may be heated by a power source, which is not shown, provided to the main body 2. The main body 2 has the motor 4 being a driving device and a fuser gear 63 (see FIG. 1), and a driving force from the motor 4 may be transmitted through the fuser gear 63 to the heat roller 61. The fuser gear 63 is rotatable by the driving force from the motor 4. The toner images on the sheet S conveyed to the fuser 6 may be thermally fixed to the sheet S as the sheet S passes through a position between the heat roller 61 and the pressure roller 62.

The sheet S with the thermally fixed toner images may be conveyed downstream from the fuser 6 in a conveying direction and further conveyed by an intermediate ejection roller pair 64 and by an ejection roller pair 65, which is located downstream in the conveying direction from the intermediate ejection roller pair 64, to be ejected at the ejection tray 21*b*.

Figure 4:
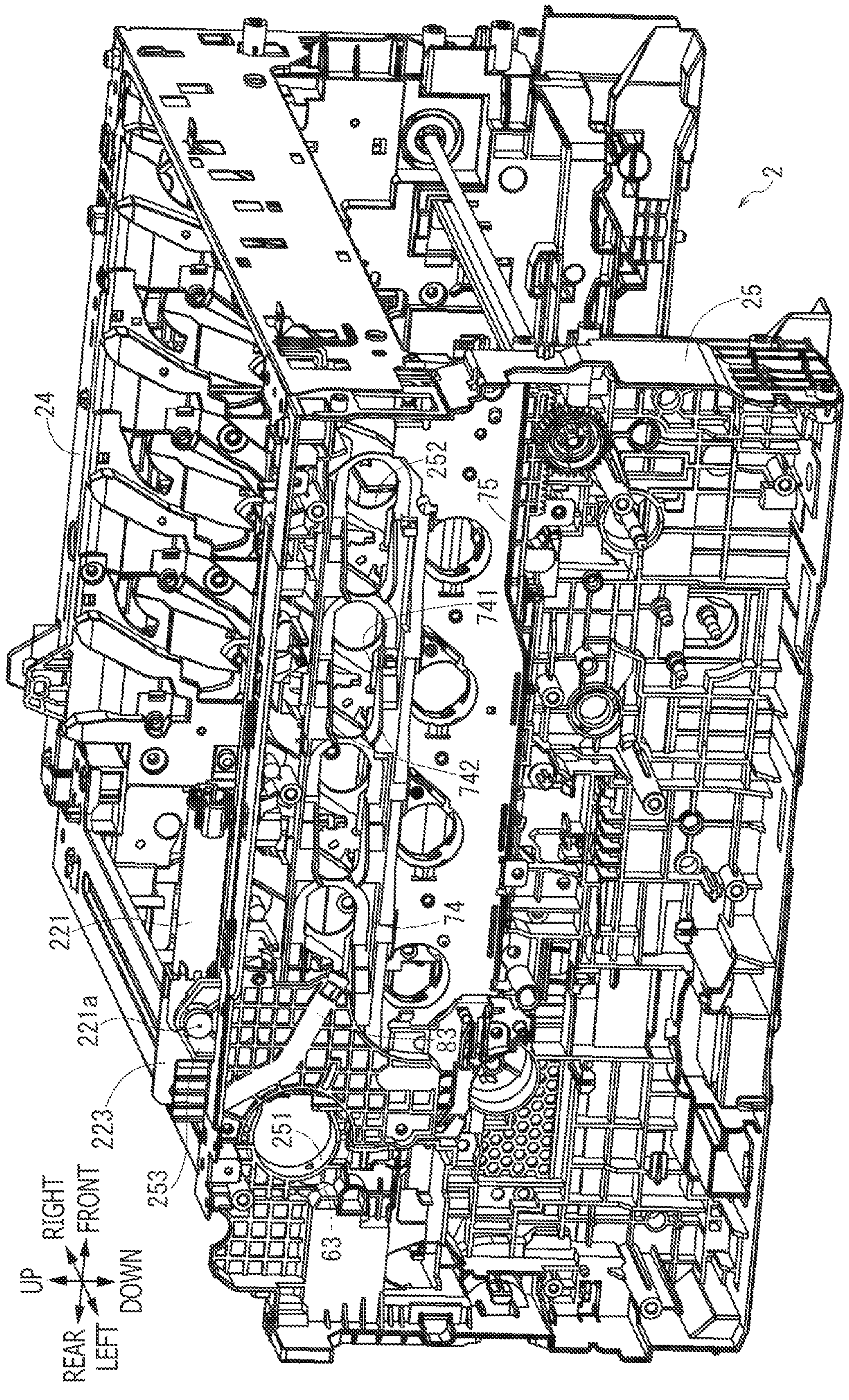
FIG. 4 is a perspective view of a main body of the image forming apparatus.

As shown in FIG. 4, the main body 2 has a first body-frame 24 and a second body-frame 25, which are separated in the widthwise direction. The first body-frame 24 is located on a rightward end of the main body 2 and spreads in the front-rear direction and the vertical direction. The second body-frame 25 is located on a leftward end of the main body 2 and spreads in the front-rear direction and the vertical direction.

The process cartridges 50 and the fuser 6 are arranged between the first body-frame 24 and the second body-frame 25. The first body-frame 24 is located rightward with respect to the process cartridges 50 and the fuser 6, and the second body-frame 25 is located leftward with respect to the process cartridges 50 and the fuser 6. The process cartridges 50 are detachably supported by the first body-frame 24 and the second body-frame 25.

Fuser Gear

Figure 5:
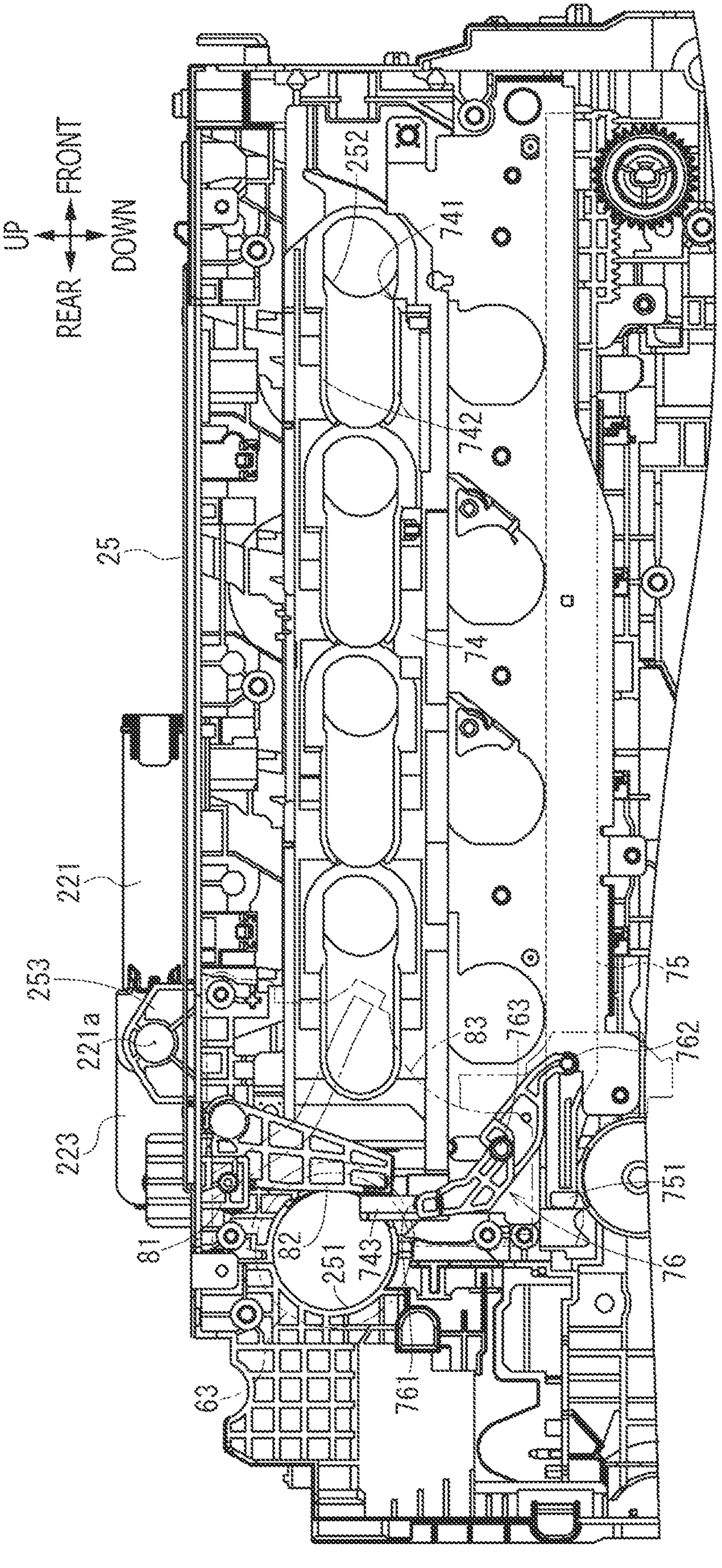
FIG. 5 is a leftward side view of the main body.

As shown in FIGS. 4-5, the fuser gear 63 is supported by the second body-frame 25 at a rearward end position in the second body-frame 25. The fuser gear 63 is a gear for transmitting the driving force to the fuser 6 that may fix the toner images onto the sheet S.

Figure 6:
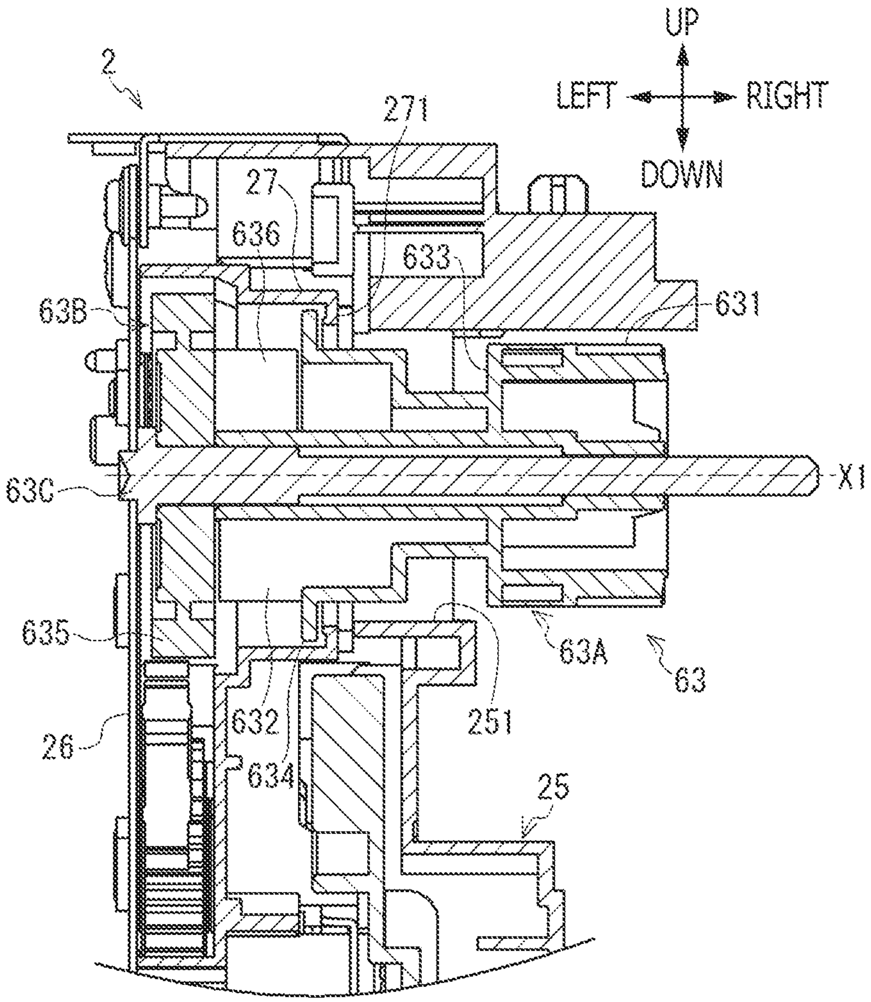
FIG. 6 is a cross-sectional frontward view of a fuser gear supported by a second body-frame.
Figure 7A:
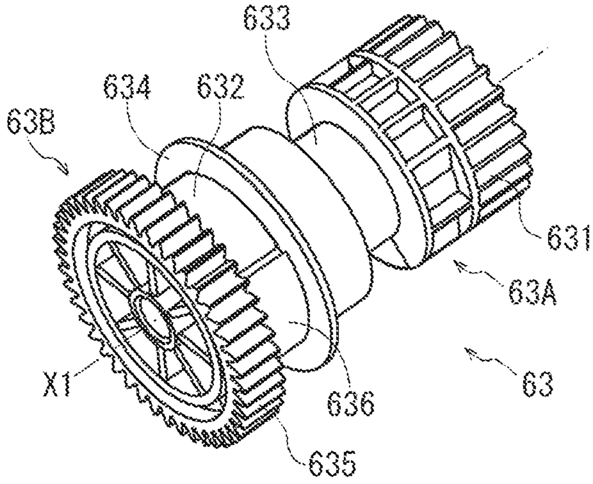
FIG. 7A is a perspective view of the fuser gear.
Figure 7B:
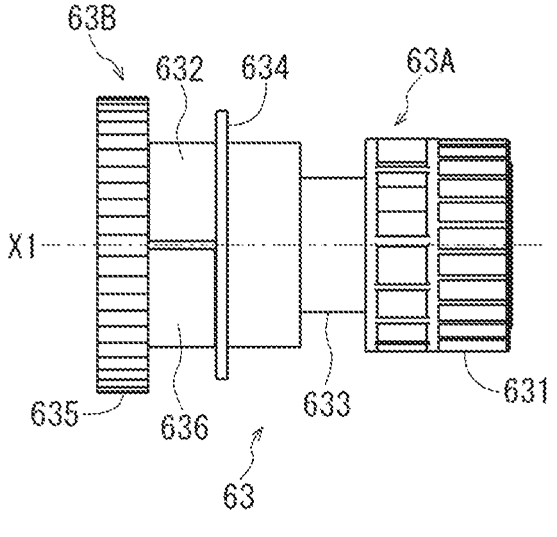
FIG. 7B is a frontward view of the fuser gear.

The fuser gear 63 as shown in FIGS. 6-8 is rotatable on a rotation axis X1 and is arranged in a posture, in which the rotation axis X1 aligns with the widthwise direction. The fuser gear 63 includes a first part 63A, a second part 63B, and a rotation shaft 63C.

The first part 63A is formed of a resin member and includes a first gear 631, a mating portion 632, a dent 633, and a flange portion 634. The first gear 631 is connected to the heat roller 61 in the fuser 6 and may transmit the driving force to the heat roller 61. The mating portion 632 may be mated with the second part 63B.

The dent 633 is formed to have a diameter smaller than diameters of the first gear 631 and the mating portion 632 and is dented inward in a radial direction with respect to outer circumferences of the first gear 631 and the mating portion 632. The flange portion 634 has a form of a disc protruding radially outward with respect to the mating portion 632. In the first gear 621, the first gear 631, the dent 633, the flange portion 634, and the mating portion 632 are arranged in this given order in a direction from right to left.

The second part 63B is formed of a resin member and includes a second gear 635 and a mated portion 636. In the second part 63B, the mated portion 636 and the second gear 635 are arranged in this given order in the direction from right to left. The second gear 635 is connected with the motor 4, and the driving force from the motor 4 may be input to the second gear 635. The mated portion 636 may be mated with the mating portion 632. With the mating portion 632 and the mated portion 636 being mated, the first part 63A and the second part 63B are connected and integrally rotatable.

The fuser gear 63, which is formed of the first part 63A and the second part 63B connected with each other, works as a double gear having the first gear 631 and the second gear 635. In the fuser gear 63, the first gear 631, the dent 633, and the second gear 635 are arranged in this given order in the direction from right to left. In other words, the dent 633 is located between the first gear 631 and the second gear 635 in the widthwise direction.

The rotation shaft 63C is formed of a metal rod extending in the rotation axis X1 and is inserted through the first part 63A and the second part 63B. The first part 63A and the second part 63B are rotatable with respect to the rotation shaft 63C. In the fuser gear 63, the first part 63A has the dent 633, of which diameter is smaller than the diameters of the other parts; therefore, the dent 633 may be thinner and may be less rigid than the other parts. However, with the rotation shaft 63C made of metal, rigidity of the dent 633 in the fuser gear 63 may be secured.

The main body 2 has a metal frame 26, which is located leftward with respect to the second body-frame 25 and is supported by the second body-frame 25. The rotation shaft 63C is supported by the metal frame 26. With the rotation shaft 63C being supported by the metal frame 26, the fuser gear 63 is supported by the second body-frame 25 through the metal frame 26.

The second body-frame 25 has a through hole 251, which is formed through the second body-frame 25 in the widthwise direction. The fuser gear 63 is inserted in the through hole 251 penetrating the second body-frame 25 leftward.

The first part 63A of the fuser gear 63 is located rightward with respect to the second part 63B, and the first gear 631 of the first part 63A protrudes rightward from the second body-frame 25. The second gear 635 of the second part 63B is located leftward with respect to the second body-frame 25. In other words, in the widthwise direction, the first part 63A protrudes inward from the second body-frame 25 of the main body 2, in which the fuser 6 is located; the second part 63B is located outward with respect to the second body-frame 25 of the main body 2; and the first part 63A is located closer than the second part 63B to the fuser 6.

In the fuser gear 63, the first part 63A is formed of a first material, and the second part 63B is formed of a second material different from the first material. The first material may be heat-resistant resin, and the second material may be heat-unresistant resin.

The first part 63A formed of the first material is located closer than the second part 63B formed of the second material to the fuser 6, while the fuser 6 produces heat. In this regard, the first part 63A located closer to the fuser 6 is formed of the heat-resistant resin. Therefore, influence by the heat from the fuser 6 on the fuser gear 63 may be limited. Meanwhile, the second part 63B located farther than the first part 63A from the fuser 6 is formed of the heat-unresistant resin, which may be less expensive than the heat-resistant resin. Therefore, manufacturing cost of the fuser gear 63 may be restrained from increasing. Optionally, however, the second part 63B may be, similarly to the first part 63A, formed of heat-resistant resin.

The main body 2 has a cover 27 to shield the fuser gear 63. The cover 27 is located between the second body-frame 25 and the metal frame 26 in the widthwise direction and is supported by the metal frame 26. The cover 27 shields the second part 63B and a leftward side of the first part 63A of the fuser gear 63.

The cover 27 has a restrictive rib 271, which protrudes inward in a radial direction from the outer circumference of the fuser gear 63. The restrictive rib 271 is located rightward with respect to the flange portion 634 in the first part 63A of the fuser gear 63 and may engage with the flange portion 634. The restrictive rib 271 engaged with the flange portion 634 may restrict the fuser gear 63 from moving along the rotation axis X1.

For restricting the fuser gear 63 from moving in the direction of the rotation axis X1, for example, the first part 63A of the fuser gear 63 may be extended in the direction of the rotation axis X1 to form a hook, by which the first part 63A may be hooked to the rotation shaft 63C. However, compared to this formation, with the restrictive rib 271 formed in the cover 27 as described above, the fuser gear 63 may be downsized in the direction of the rotation axis X1. Moreover, with the cover 27 having the restrictive rib 271 to engage with the fuser gear 63, no additional procedure to provide a formation to be hooked with the hook to the rotation shaft 63C is necessary, and the manufacturing cost of the fuser gear 63 may be restrained from increasing.

Cartridge-Side Couplings

As shown in FIGS. 9A-9B, the process cartridges 50 have cartridge-side couplings 521, which are coupled with leftward ends of the developing rollers 52 on one-one-one basis. The cartridge-side couplings 521 are coupling members that may transmit a driving force to drivable devices in the process cartridges 50. In particular, the cartridge-side couplings 521 may transmit the driving force to the developing rollers 52 in the process cartridges 50. Each developing roller 52 and the corresponding cartridge-side coupling 521 are arranged coaxially. The cartridge-side couplings 521 are located rightward with respect to the second body-frame 25.

Body-Side Couplings

As shown in FIGS. 9A-9B, the main body 2 has body-side couplings 71, driving gears 72, and springs 73. The body-side couplings 71 are connectable with the cartridge-side couplings 521 on one-on-one basis. The body-side couplings 71 connected with the cartridge-side couplings 521 may transmit the driving force from the motor 4 to the developing rollers 52. The body-side couplings 71 are arranged at positions corresponding to the process cartridges 50 attached to the image forming apparatus 1 aligning in the front-rear direction.

The body-side couplings 71 are located leftward with respect to the second body-frame 25 and are supported by the second body-frame 25 movably in directions to be closer to and farther from the cartridge-side couplings 521 along the widthwise direction. Each body-side coupling 71 has a joint 711, at which the body-side coupling 71 is connected with the cartridge-side coupling 521, and a flange 712 having a larger diameter than the joint 711. The joint 711 and the flange 712 are arranged coaxially. The joint 711 in the body-side coupling 71 is movable in the widthwise direction to be closer to or farther from the cartridge-side coupling 521.

Each body-side coupling 71 is movable between a connecting position (see FIG. 9B), at which the body-side coupling 71 and the cartridge-side coupling 521 are connected, and a separated position (see FIG. 9A), which is leftward with respect to the connecting position and at which the body-side coupling 71 and the cartridge-side coupling 521 are separated. More specifically, each joint 711 in the body-side coupling 71 is movable between a joint-connecting position (see FIG. 9B), at which the joint 711 and the cartridge-side coupling 521 are connected, and a joint-separated position (see FIG. 9A), which is leftward with respect to the joint-connecting position and at which the joint 711 and the cartridge-side coupling are separated. In other words, when the joint 711 is located at the joint-connecting position, the body-side coupling 71 is at the connecting position, and when the joint 711 is located at the joint-separated position, the body-side coupling 71 is at the separated position. When the top cover 21 is at the closed position, the joints 711 are located at the joint-connecting positions, and the body-side couplings 71 are located at the connecting positions. When the top cover 21 is at the open position, the joints 711 are located at the joint-separated positions, and the body-side couplings 71 are located at the separated positions.

The second body-frame 25 has communication holes 252 formed there-through in the widthwise direction at positions coincident with the cartridge-side couplings 521 and the body-side couplings 71 in the widthwise direction. When the body-side couplings 71 are located at the respective connecting positions, the joints 711 protrude rightward from the second body-frame 25 through the communication holes 252 in the second body-frame 25 (see FIG. 9B). When the body-side couplings 71 are located at the respective separated positions, the body-side couplings 71 are retracted entirely leftward from the second body-frame 25 (see FIG. 9A).

The driving gears 72 are connected to the motor 4 and are rotatable integrally with the body-side couplings 71. When the body-side couplings 71 are located at the connecting positions, the driving force from the motor 4 may rotate the driving gears 72 and may be transmitted to the developing rollers 52 through the joints 711 and the cartridge-side couplings 521 that are connected with each other. On the other hand, when the body-side couplings 71 are located at the separated positions, the joints 711 and the cartridge-side couplings 521 are separated; therefore, even when the driving force from the motor 4 rotates the driving gears 72, the driving force may not be transmitted to the developing rollers 52.

The springs 73 are each interposed between the flange 712 of the body-side coupling 71 and the driving gear 72 and urges the body-side coupling 71 rightward. The body-side couplings 71 may be moved from the separated positions to the connecting positions by the urging force of the springs 73.

The developing rollers 52 are movable between the contact positions and the separate positions while the body-side couplings 71 are located at the connecting positions. The body-side couplings 71 are, when the developing rollers 52 are located at the contact positions, connected to the cartridge-side couplings 521 in a posture, in which axes Y of the body-side couplings 71 and the joints 711 are parallel to axes X of the developing rollers 52.

When the developing rollers 52 move from the contact positions to the separate positions, the cartridge-side couplings 521 may move along with the developing rollers 52, and the body-side couplings 71 connected with the cartridge-side couplings 521 may be pulled to follow the cartridge-side couplings 521. The body-side couplings 71 moving to follow the cartridge-side couplings 521 may be in skewed postures with respect to the axes X (see FIG. 22B).

Driving Body-Side Couplings with Joint Cam

As shown in FIGS. 5 and 9A-9B, the main body 2 has a joint cam 74, which is supported by the second body-frame 25 movably in the front-rear direction. In other words, the front-rear direction coincides with a movable direction of the joint cam 74. The joint cam 74 is formed of an elongated plate extending in the front-rear direction and is located frontward with respect to the fuser gear 63. The joint cam 74 may move rearward to be located at a first position (see FIG. 9B), at which the joint cam 74 locates the body-side couplings 71 at the connecting position, and may move frontward to be located at a second position (see FIG. 9A), at which the joint cam 74 locates the body-side couplings 71 at the separated positions. In other words, the joint cam 74 is movable between the first position, at which the joint cam 74 locates the body-side couplings 71 at the connecting position, and the second position, at which the joint cam 74 locates the body-side couplings 71 at the separated positions.

As shown in FIGS. 9A-9B and 10A-10B, the joint cam 74 has openings 741, slanting ribs 742, a rail 743, and a driver hole 744. The openings 741 and the slanting ribs 742 are arranged at positions corresponding to the four (4) body-side couplings 71 and align in line along the front-rear direction. The joint cam 74 has the plurality of, e.g., four (4), openings 741-1, 741-2, 742-3, 741-4, which are arranged in line and adjoin one another along the movable direction of the joint cam 74.

Among the opening 741-1 is located at a most frontward position, the opening 741-2 adjoins the opening 741-1 at a position rearward from the opening 741-1, the opening 741-3 adjoins the opening 741-2 at a position rearward from the opening 741-2, and the opening 741-4 adjoins the opening 741-3 at a position rearward from the opening 741-3.

The openings 741 are formed through the joint cam 74 in the widthwise direction and have forms of ellipses elongated in the front-rear direction. Each opening 741 includes a first opening 741*a* located rearward and a second opening 741*b* formed frontward continuously from the first opening 741*a*. In other words, the first opening 741*a* and the second opening 741*b* form the single opening 741. Through the openings 741, the joints 711 of the body-side couplings 71 are inserted from the leftward side.

The slanting ribs 742 are formed on an upper edge and a lower edge of the first opening 741*a* in each opening 741. The slanting ribs 742 protrude leftward along the axes Y of the body-side couplings 71. The slanting ribs 742 each have a slanting surface, which protrudes rear-leftward. The slanting ribs 742 may contact the flanges 712 of the body-side couplings 71.

The joint cam 74 may be moved rearward to be located at the first position. When the joint cam 74 is at the first position, the joints 711 of the body-side couplings 71 are located in the second openings 741*b* in the openings 741. When the joints 711 are located in the second openings 741*b*, the flanges 712 are separated from the slanting ribs 742, and the body-side couplings 71 are urged rightward by the urging force of the springs 73 and located at the connecting positions.

When the joint cam 74 is moved frontward from the first position, the flanges 712 may contact or collide with the slanting ribs 742 and may be pushed leftward by the slanting surfaces of the slanting ribs 742, and the body-side couplings 71 may move leftward from the connecting positions.

When the joint cam 74 moves frontward, the joints 711 are located in the first openings 741*a* in the openings 741, and the body-side couplings 71 moved leftward are located at the separated positions. Thus, the slanting ribs 742 may, when the joint cam 74 moves between the first position and the second position, contact the flanges 712 and move the body-side couplings 71 between the connecting positions and the separated positions.

Each slanting rib 742 includes a first slanting rib 742*a*, which is located on the upper edge of the first opening 741*a* in each opening 741 and extends in the front-rear direction, and a second slanting rib 742*b*, which is located on the lower edge of the first opening 741*a* in each opening 741 and extends in the front-rear direction. In other words, the first slanting rib 742*a* is located on one side of the first opening 741*a* in a direction intersecting orthogonally with the movable direction of the joint cam 74, and the second slanting rib 742*b* is located on the other side of the first opening 741*a* in the direction intersecting orthogonally with the movable direction of the joint cam 74.

Between one end of the first slanting rib 742*a* in the opening 741-1 and one end of the second slanting rib 742*b* in the opening 741-1, a gap d is formed. More specifically, the gap d is formed between an end of the first slanting rib 742*a* in the opening 741-1, which is located at the most frontward position, on one side toward the second opening 741*b* in the opening 741-2 that adjoins the opening 741-1, and an end of the second slanting rib 742*b* in the opening 741-1 on one side toward the second opening 741*b* in the opening 741-2 that adjoins the opening 741-1.

Thus, the gap d is formed between the first slanting rib 742*a* and the second slanting rib 742*b* in one of the plurality of openings 741-1, 741-2 that adjoin each other. Thereby, the first slanting rib 742*a* and the second slanting rib 742*b* in the opening 741-1, which is the one of the plurality of openings 741-1, 741-2, may be restrained from interfering with the flange 712 in the body-side coupling 71 located in the opening 741-2, which is the other of the plurality of openings 741-1, 741-2. Therefore, a distance between the axes Y of the plurality of body-side couplings 71, which are arranged at the positions corresponding to the openings 741, may be shortened, and the main body 2 of the image forming apparatus 1 may be downsized.

The gap d is formed similarly between the first slanting rib 742*a* and the second slanting rib 742*b* in the opening 741-2 and between the first slanting rib 742*a* and the second slanting rib 742*b* in the opening 741-3.

The rail 743 is formed in a rearward end area in the joint cam 74 and has a form of a groove elongated in the vertical direction. The driver hole 744 is formed through the joint cam 74 in the widthwise direction and extends in the vertical direction. The driver hole 744 is located in the rearward end area in the joint cam 74 at a position frontward with respect to the rail 743. An upper end of the rail 743 is located to be lower than an upper end of the driver hole 744.

As shown in FIG. 20, each second opening 741*b* has a first edge 741A extending in the front-rear direction and a second edge 741B facing the first edge 741A in the vertical direction and extending linearly in the front-rear direction. In other words, the first edge 741A and the second edge 741B face each other in the direction intersecting orthogonally with the movable direction of the joint cam 74. The second edge 741B is located to be lower than the first edge 741A. The first edge 741A and the second edge 741B are formed linearly to extend in the front-rear direction.

Thus, the second opening 741*b*, in which the body-side coupling 71 located at the connecting position is placed, has the first edge 741A and the second edge 741B extending in the front-rear direction. Therefore, rather than enlarging the entire opening 741 radially, the second opening 741*b* may be extended toward the first opening 741*a*.

In this regard, even though, for example, the joint cam 74 may stop at a position displaced from the first position by a small amount, without increasing the size of the image forming apparatus 1 but by stretching the second opening 741*b* in the front-rear direction, the joint cam 74 may be restrained from contacting or colliding with the body-side coupling 71. Accordingly, defects in image forming due to irregular rotation or vibration of the cartridge-side couplings 521 that may be caused by the joint cam 74 contacting the body-side couplings 71 may be restrained.

Moreover, the first edges 741A and the second edges 741B are formed linearly to extend in the front-rear direction. Therefore, the second openings 741*b* may be stretched toward the first openings 741*a* more efficiently.

As shown in FIG. 20, the first edge 741A has a length L1 in the front-rear direction, and the second edge 741B has a length L2 in the front-rear direction. The length L2 of the second edge 741B is smaller than the length L1 of the first edge 741A. In other words, the second edge 741B is formed to be shorter in the front-rear direction than the first edge 741A. The first edge 741A and the second edge 741B are apart from each other in the vertical direction by a distance D1.

As shown in FIGS. 21A-21B, a sign r denotes a radius of the joint 711 in the body-side coupling 71, and a sign R denotes a radius of the flange 712 in the body-side coupling 71. The distance D1 between the first edge 741A and the second edge 741B in the vertical direction is, throughout an entire extending range of the first edge 741A and the second edge 741B in the front-rear direction, smaller than a sum (r+R) of the radius r of the joint 711 and the radius R of the flange 712.

Therefore, in a case where the body-side couplings 71 move to follow the cartridge-side couplings 521 in the skewed postures with respect to the axes X, such as the case where the developing rollers 52 are moved to separate from the photosensitive drums 51, the body-side couplings 71 may be restrained from falling off from the second openings 741*b* (see the body-side coupling 71 located in the second opening 741*b* in the opening 741-2 drawn in dash-and-dots lines FIG. 20).

In other words, without causing the space inside the main body 2 to increase, as may be caused by, for example, enlarging the radius of the flanges 712 in the body-side couplings 71, or without causing the interference between the body-side couplings 71 and the joint cam 74, as may be caused by reducing the distance D1 between the first edge 741A and the second edge 741B of the second opening 741*b*, the body-side couplings 71 may be restrained from falling off from the second openings 741*b* partly or entirely.

As shown in FIGS. 22A-22B, the joint 711 located in the second opening 741*b* in the opening 741 is movable between a third position (see FIG. 22A), at which the developing roller 52 is located at the contact position, and a fourth position (see FIG. 22B), at which the developing roller 52 is located at the separate position.

The third position of the joint 711 is a position, at which the axis Y of the joint 711 aligns in parallel with the axis X of the developing roller 52. The developing roller 52 moving from the contact position to the separate position may move obliquely upper-frontward. The fourth position of the joint 711 is a position, at which the axis Y of the joint 711 skews upper-frontward with respect to the axis X of the developing roller 52. In other words, the fourth position of the joint 711 is located toward the first edge 741A in the vertical direction on a side opposite to the first opening 741*a* in the front-rear direction with respect to the third position.

A frontward end of the first edge 741A, which is an end opposite to an end of the first edge 741A closer to the first opening 741*a*, and a frontward end of the second edge 741B, which is an end opposite to an end of the second edge 741B closer to the first opening 741*a*, are connected with a third edge 741C.

As shown in FIGS. 20 and 22A-22B, the third edge 741C includes a first arc edge 741C-1, which is in a form rounded along an outer circumferential surface 711A of the joint 711 located at the third position, a second arc edge 741C-2, which is in a form rounded along an outer circumferential surface 711B of the joint 711 located at the fourth position, and a linear edge 741C-3, which is located between the first arc edge 741C-1 and the second arc edge 741C-2 and extends in a direction of a tangent Z to the first arc edge 741C-1 and the second arc edge 741C-2.

The first arc edge 741C-1 is located to be lower than the third edge 741C and is formed continuously from the second edge 741B. The second arc edge 741C-2 is located to be higher than the third edge 741C and is formed continuously from the first edge 741A. A lower end of the linear edge 741C-3 is continuous with the first arc edge 741C-1, and an upper end of the linear edge 741C-3 is continuous with the second arc edge 741C-2. Within the third edge 741C, the first arc edge 741C-1, the linear edge 741C-3, and the second arc edge 741C-2 are arranged in this given order in a direction from bottom to top.

The second arc edge 741C-2 located at the upper-frontward position in the second opening 741*b*, which is in the skewing direction of the joint 711, is in the form to curve along the outer circumferential surface 711B of the joint 711 located at the fourth position. Therefore, when the joint 711 is located at the fourth position, interference between the joint 711 and the joint cam 74 may be restrained.

In other words, the second arc edge 741C-2 of the second opening 741*b* forms a retracted edge, which is retracted to avoid interference with the joint 711 of the body-side coupling 71 when the developing roller 52 moves to the separate position. With the second arc edge 741C-2 providing the retracted edge, when the body-side coupling 71 follows the developing roller 52 moving to the separate position, the joint 711 of the body-side coupling 71 may be restrained from interfering with the second opening 741*b* more effectively.

Moreover, the second opening 741*b* has the third edge 741C, which is located frontward and is formed of the second arc edge 741C-1, the second arc edge 741C-2, and the linear edge 741C-3. Thus, the second opening 741*b* is in the preferable form to enable the joints 711 of the body-side couplings 71 to avoid interference with the second openings 741*b* when the developing rollers 52 are separated from the photosensitive drums 51.

Moreover, the second opening 741*b* has the second edge 741B, which is shorter than the first edge 741A. Therefore, when the body-side coupling 71 is skewed upper-frontward toward the frontward end of the first edge 741A, which is at the end of the first edge 741A on the side opposite to the first opening 741*a*, a margin to avoid the interference between the joint 711 and the joint cam 74 may be reserved on the side of the first edge 741A. On the other hand, while the interference may not necessarily be concerned in an area in the second opening 741*b* on the side toward the second edge 741B, the area in the second opening 741*b* on the side of the second edge 741B may be reduced, and the image forming apparatus 1 may be downsized as a whole.

As shown in FIG. 20, the first opening 741*a* has a fourth edge 741D formed linearly to extend in the front-rear direction and a fifth edge 741E facing the fourth edge 741D in the vertical direction and extending linearly in the front-rear direction. The fourth edge 741D and the fifth edge 741E are apart from each other in the vertical direction by a distance D2.

Each opening 741 includes a first connecting edge 741F, which connects the first edge 741A and the fourth edge 741D, and a second connecting edge 741G, which connects the second edge 741B and the fifth edge 741E. The first connecting edge 741F is located between the first edge 741A and the fourth edge 741D in the front-rear direction. The second connecting edge 741G is located between the second edge 741B and the fifth edge 741E in the front-rear direction.

The distance D1 between the first edge 741A and the second edge 741B is greater than the distance D2 between the fourth edge 741D and the fifth edge 741E. The first connecting edge 741F is formed of a slanting edge slanting at an obtuse angle θ1 with respect to the front-rear direction. The second connecting edge 741G is formed of a slanting edge slanting at an obtuse angle θ2 with respect to the front-rear direction.

Thus, with the forms of the first connecting edge 741F and the second connecting edge 741G slanting with respect to the front-rear direction at the obtuse angles ƒ1, ƒ2, respectively, the body-side coupling 71 may be guided by the first connecting edge 741F and the second connecting edge 741G to move between the first opening 741*a* and the second opening 741*b* smoothly.

Positional Relation Among Joint Cam, Fuser Gear, and Operable Cam

As shown in FIG. 5, the main body 2 has an operable cam 75 and a link 76. The operable cam 75 is formed of a longitudinal plate elongated in the front-rear direction and is supported by the second body-frame 25 movably in the front-rear direction. The operable cam 75 has a contact portion 751, which may contact the contact portion 751, at a rearward end area.

The operable cam 75 is movable between an operable position, at which the operable cam 75 may act on the process cartridges 50, and an inoperable position, at which the operable cam 75 may not act on the process cartridges 50. The operable cam 75 may move frontward to be located at the operable position and may move rearward to be located at the inoperable position. Actions by the operable cam 75 located at the operable position acting on the process cartridges 50 may include, for example, a locking action to lock the process cartridges 50 to the main body 2 and a separating action to separate the developing rollers 52 from the photosensitive drums 51.

As shown in FIGS. 11A-11C, the link 76 extends substantially vertically and has a boss 761 located at an upper end, a pressing portion 762 located at a lower end, and a pivot shaft 763 located at an intermediate position between the boss 761 and the pressing portion 762. The link 76 is supported pivotably by the second body-frame 25 to pivot on the pivot shaft 763.

As shown in FIG. 5, the boss 761 in the link 76 is slidably engaged with the rail 743 of the joint cam 74. The rail 743 may guide the boss 761 in the link 76 to slide in the vertical direction. The boss 761 may move in the vertical direction and the front-rear direction along with the joint cam 74 moving in the front-rear direction. The pressing portion 762 may contact the contact portion 751 of the operable cam 75.

The link 76 may, when the joint cam 74 moves rearward, pivot in a direction to move the boss 761 rearward and the pressing portion 762 frontward. The link 76 may, when the joint cam 74 moves frontward, pivot in a direction to move the boss 761 frontward and the pressing portion 762 rearward.

The pressing portion 762 moving rearward may contact the contact portion 751 of the operable cam 75, which is located at the operable position, and press the contact portion 751 rearward to move the operable cam 75 to the inoperable position. With the pressing portion 762 of the link 76 contacting the contact portion 751 of the operable cam 75, the joint cam 74 and the operable cam 75 are coupled through the link 76.

As shown in FIGS. 5, 9B, and 12, when the top cover 21 is at the closed position, and the joint cam 74 moved rearward is located at the first position, positions of the rearward portion of the joint cam 74 and the fuser gear 63 in the front-rear direction overlap. In other words, the image forming apparatus 1 is in the arrangement, in which the joint cam 74 located at the first position overlaps the fuser gear 63, and thereby a volume of the image forming apparatus 1 may be reduced in the front-rear direction.

While the joint cam 74 is located at the first position, the rear end portion of the joint cam 74 enters the dent 633 in the fuser gear 63. In particular, when the joint cam 74 is located at the first position, the upper end of the rail 743 formed in the rearward portion in the joint cam 74 is accepted in the dent 633 of the fuser gear 63 and is not in contact with the fuser gear 63.

Thus, the joint cam 74 is in the arrangement such that, when located at the first position, the rear end portion of the joint cam 74 sits in the dent 633 in the fuser gear 63. Therefore, while the joint cam 74 located at the first position may overlap the fuser gear 63 in the front-rear direction, the joint cam 74 may be restrained from colliding with the fuser gear 63. Accordingly, while the main body 2 may be downsized, the rail 743 in the joint cam 74 and the fuser gear 63 may be restrained from colliding, and a movable range for the joint cam 74 in the front-rear direction may be secured.

Moreover, the dent 633 of the fuser gear 63, which allows entry of the rearward portion of the joint cam 74, is located between the first gear 631 and the second gear 635, which form the fuser gear 63 to work as the double gear. In this arrangement, in a projection view when the joint cam 74 located at the first position is viewed along a direction intersecting orthogonally with the rotation axis X1 of the fuser gear 63, the rearward portion of the joint cam 74 overlaps the dent 633. Therefore, without affecting the function of the fuser gear 63, the joint cam 74 may be restrained from interfering with the fuser gear 63.

Moreover, as shown in FIG. 12, the upper end of the rail 743 in the joint cam 74 is located to be lower than the rotation axis X1 of the fuser gear 63. Therefore, when the upper end of the rail 743 enters the dent 633 in the fuser gear 63, a clearance between the joint cam 74 and the fuser gear 63 may be reserved substantially.

Moreover, as shown in FIG. 12, when the joint cam 74 is located at the first position, the link 76 is in a leaning posture, in which the boss 761 is located rearward with respect to the pivot shaft 763, and the boss 761 is at a lower position. The lower position of the boss 761 is a position where the boss 764 is located at a lower end of the rail 743. When the top cover 21 pivots from the closed position toward the open position and the joint cam 74 moves frontward from the first position, the boss 761 may be guided by the rail 743 to move frontward and upward from the lower position.

As shown in FIG. 13, when the joint cam 74 moved frontward from the first position reaches a third position between the first position and the second position, the link 76 stands in an upright posture, in which the boss 761 is located substantially above the pivot shaft 763, and the boss 761 of the link 76 is located at an upper position higher than the lower position. The upper position of the boss 761 is a position where the boss 761 is located at the upper end of the rail 743. As shown in FIG. 14, when the top cover 21 pivots further toward the open position and the joint cam 74 moves from the third position to the second position, the link 76 is placed in a leaning posture, in which the boss 761 is located frontward with respect to the pivot shaft 763, and the boss 761 is located at the lower position.

Thus, the boss 761 in the link 76 may move between the lower position and the upper position while the joint cam 74 moves between the first position and the second position, and the boss 761 is located at the lower position when the joint cam 74 is either in the first position or the second position. The lower position of the boss 761 is a position, at which the boss 761 may not interfere with the fuser gear 63. For example, the lower position of the boss 761 may be set to be lower than the fuser gear 63. In this arrangement, even when the joint cam 74 moves to the first position, at which the joint cam 74 is closer to the fuser gear 63 than the second position, the boss 761 may be restrained from interfering with the fuser gear 63.

As the top cover 21 pivots from the closed position toward the open position, the joint cam 74 may move frontward from the first position toward the second position, and when the joint cam 74 reaches the second position, the top cover 21 is located at an intermediate position (see FIG. 14) between the closed position and the open position. When the top cover 21 pivots further from the intermediate position to the open position, as shown in FIG. 15, the joint cam 74 remains at the second position.

Driving Mechanism of Joint Cam

As shown in FIGS. 4 and 14, the second body-frame 25 has a pivot support 253, which supports the cylinder 221 of the damper 22 pivotably to pivot on the support point 221*a*. The pivot support 253 is located at an upper and rearward end position of the second body-frame 25. The cylinder 221 has a protrusive portion 223, which protrudes to a side of the support point 221*a* opposite to the cylinder 221.

The main body 2 includes a pressure applier 81, a pivotable piece 82, and a profile member 83. The pressure applier 81 is supported by the protrusive portion 223 of the damper 22. The pivotable piece 82 and the profile member 83 are supported by the second body-frame 25. In the widthwise direction, the pivotable piece 82 is located leftward with respect to the joint cam 74, the pressure applier 81 is located leftward with respect to the pivotable piece 82, and the profile member 83 is located leftward with respect to the pressure applier 81.

The pivotable piece 82 may move the joint cam 74 between the first position and the second position and is supported pivotably by the second body-frame 25. The pivotable piece 82 may pivot between a first pivot position (see FIG. 12), at which the pivotable piece 82 places the joint cam 74 at the first position, and a second pivot position (see FIGS. 14 and 15), at which the pivotable piece 82 places the joint cam 74 at the second position.

As shown in FIGS. 16A-16C, the pressure applier 81 includes a body 811, a supporting pin 812, a pressing pin 813, and a profile pin 814. The body 811 is in a form of a rectangular plate elongated in the vertical direction. Plane surfaces of the body 811 face rightward and leftward.

The supporting pin 812 protrudes leftward from an upper-end position on a leftward surface of the body 811 and is pivotably supported by the protrusive portion 223 of the damper 22. The pressing pin 813 protrudes rightward from a lower-end position on a rightward surface of the body 811 and may contact the pivotable piece 82. The profile pin 814 protrudes leftward from a lower-end position on the leftward surface of the body 811 and is engageable with the profile member 83. The profile pin 814 and the pressing pin 813 are arranged coaxially.

The pressure applier 81 is movable along with the top cover 21 moving between the open position and the closed position. When the top cover 21 moves from the closed position toward the open position, the pressure applier 81 may move along and contact the pivotable piece 82 to apply pressure to the pivotable piece 82 to move in a direction from the first pivot position toward the second pivot position.

As shown in FIGS. 17 and 18A-18B, the pivotable piece 82 has a body 821, a supportive portion 822, and an engageable protrusion 823. The body 821 is in a form of an approximately trapezoidal plate, in which a dimension of a lower edge in the front-rear direction is smaller than a dimension of an upper edge in the front-rear direction. Plane surfaces of the body 821 face rightward and leftward. The supportive portion 822 is located at an upper-frontward end position in the body 821. The supportive portion 822 is pivotably supported by the second body-frame 25. The pivotable piece 82 may pivot on the supportive portion 822 to move between the first pivot position and the second pivot position.

The engageable protrusion 823 protrudes rightward from a rightward surface of the body 821 and is slidably engaged with the driver hole 744 in the joint cam 74. The engageable protrusion 823 may, as the pivotable piece 82 pivots between the first pivot position and the second pivot position, move along the driver hole 744 vertically. The engageable protrusion 823 is, when the pivotable piece 82 is located at the first pivot position, located in a vertically intermediate area (see FIG. 12) in the driver hole 744 and is, when the pivotable piece 82 is located at the second pivot position, located at an upper-end area (see FIGS. 14 and 15) in the driver hole 744, which is located to be higher than the vertically intermediate area.

The body 821 has an upper edge 821A and a rear edge 821B, and the pressing pin 813 of the pressure applier 81 may contact the upper edge 821A or the rear edge 821B. The body 821 includes a first contact position P1, a second contact position P2, and a third contact position P3, at which the pressing pin 813 may contact the body 821, along the upper edge 821A and the rear edge 821B.

The first contact position P1 is located in a rearward end area on the upper edge 821A of the body 821 and is a position, at which the pressing pin 813 contacts the body 821 when the top cover 21 is at the closed position. The second contact position P2 located in an upper area on the rear edge 821B of the body 821 and is a position, at which the pressing pin 813 contacts the body 821 when the top cover 21 is at the intermediate position. The third contact position P3 is located in a lower-end area on the rear edge 821B of the body 821 and is a position, at which the pressing pin 813 contacts the body 821 when the top cover 21 is at the open position.

The body 821 has a first range R1, which is between the first contact position P1 and the second contact position P2 along a ridge including the upper edge 821A and the rear edge 821B, a second range R2, which is between the second contact position P2 and the third contact position P3 along the ridge including the upper edge 821A and the rear edge 821B.

The body 821 has an avoidable form Fa, by which the body 821 may be restrained from interfering with the upper edge of the link 76 pivoting on the pivot shaft 763 when the pivotable piece 82 pivots between the first pivot position and the second pivot position. The avoidable form Fa is formed in the second range R2 on the rear edge 821B of the body 821.

The avoidable form Fa is recessed frontward from a line L connecting an upper end Fa1 and a lower end Fa2 of the avoidable form Fa. In this form, a distance between the rear edge 821B of the body 821 and the upper end of the link 76 located rearward with respect to the body 821 may increase, and interference between the pivotable piece 82 and the link 76 may be restrained.

As shown in FIG. 19, the profile member 83 is in a form of a plate member, of which plane surfaces face rightward and leftward, and has a profile groove 831, which engages with the profile pin 814 in the pressure applier 81. The profile groove 831 is formed on a rightward surface of the profile member 83, and the profile pin 814 engages with the profile groove 831 from the rightward side.

The pressure applier 81 may move along with the pivoting action of the damper 22, and the profile groove 831 may define a movable track for the pressing pin 813. In other words, the pressure applier 81 moves, the profile pin 814 moves along the profile groove 831, and thereby the movable track for the pressing pin 813 may be provided.

The profile groove 831 has a first groove portion 831A, a second groove portion 831B, and a bent portion 831C. The first groove portion 831A inclines from an upper end of the profile member 83 obliquely frontward and downward. The second groove portion 831B is continuous from a lower end of the first groove portion 831A and inclines obliquely frontward and downward with respect to a horizontal direction at a smaller angle than the inclination of the first groove portion 831A. The bent portion 831C is located at a border between the first groove portion 831A and the second groove portion 831B. In other words, the profile groove 831 bends at the bent portion 831C.

As shown in FIG. 12, when the top cover 21 is located at the closed position, the pressing pin 813 of the pressure applier 81 is in contact with the pivotable piece 82 at the first contact position P1 while the pivotable piece 82 is located at the first pivot position and the joint cam 74 is located at the first position.

As the top cover 21 moves from the closed position toward the open position, the damper 22 pivots in a direction, in which the cylinder 221 moves upward, and the protrusive portion 223 of the damper 22 pivots downward. As the protrusive portion 223 pivots downward, the pressure applier 81 moves. In particular, the pressure applier 81 may move along the first groove portion 831A of the profile groove 831, which engages with the profile pin 814, obliquely frontward and downward.

As the pressure applier 81 moves along the profile groove 831, the pressing pin 813 of the pressure applier 81 may press the pivotable piece 82 on the upper edge 821A or the rear edge 821B obliquely frontward and downward, and the pivotable piece 82 may pivot frontward from the first pivot position on the supportive portion 822. As the pivotable piece 82 pivots frontward, the joint cam 74 may be moved frontward from the first position by the engageable protrusion 823 engaged with the driver hole 744.

As shown in FIG. 14, when the top cover 21 moving toward the open position reaches the intermediate position, the profile pin 814 of the pressure applier 81 is located at the bent portion 831C in the profile groove 831, and the pivotable piece 82 pressed by the pressure applier 81 is located at the second pivot position. In this arrangement, the joint cam 74 moved frontward by the pivotable piece 82 is located at the second position, and the pressing pin 813 of the pressure applier 81 is in contact with the pivotable piece 82 at the second contact position P2.

Thus, in the process where the top cover 21 moves from the closed position to the intermediate position, the pressure applier 81 may move along the profile groove 831 of the pivotable piece 82 while maintaining contact with the first range R1 of the pivotable piece 82 from the first contact position P1 to the second contact position P2. Meanwhile, the pivotable piece 82 is, when the pressure applier 81 contacts the pivotable piece 82 at the second contact position P2, located at the second pivot position.

In the process where the pivotable piece 82 pivots from the first pivot position to the second pivot position, while the pivotable piece 82 has the avoidable form Fa on the rear edge 821B, the pivotable piece 82 and the link 76 may be restrained from colliding, and the joint cam 74 may be moved smoothly from the first position to the second position.

As the top cover 21 moves from the intermediate position toward the open position, the profile pin 814 in the pressure applier 81 may move from the bent portion 831C in the profile groove 831 along second groove portion 831B.

As shown in FIG. 15, when the top cover 21 moved from the intermediate position reaches the open position, the profile pin 814 of the pressure applier 81 is located in a frontward end area of the second groove portion 831B, and the pivotable piece 82 is located at the second pivot position. In this arrangement, the joint cam 74 is located at the second position, and the pressing pin 813 of the pressure applier 81 is in contact with the pivotable piece 82 at the third contact position P3.

The second groove portion 831B is formed in an angle and a shape to fit with the rear edge 821B of the pivotable piece 82 at the second pivot position. With this form of the second groove portion 381B, when the profile pin 814 moves in the profile groove 831 from the bent portion 831C to the frontward end of the second groove portion 831B, the pivotable piece 82 may be maintained in the posture to stay at the second pivot position, and the joint cam 74 may be maintained at the second position. Therefore, when the profile pin 814 moves in the profile groove 831 from the bent portion 831C to the frontward end of the second groove portion 831B, the rear edge 821B of the pivotable piece 82 may be restrained from being subject to a large load from the pressure applier 81.

Thus, in the process where the top cover 21 moves from the intermediate position to the open position, the pressure applier 81 may move along the profile groove 831 while maintaining contact with the second range R2 of the pivotable piece 82 from the second contact position P2 to the third contact position P3. Meanwhile, the pivotable piece 82 pivots to the second pivot position while the pressure applier 81 is in contact with the third contact position P3.

The pivotable piece 82 has the avoidable form Fa formed in the second range R2 between the second contact position and the third contact position P3 on the rear edge 821B, which may not be subject to the large load from the pressure applier 81. Therefore, it may not be necessary to form the pivotable piece 82 and the pressure applier 81 in larger sizes, and a volume of the main body 2 may be restrained from increasing or may be reduced.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

For example, a number of the process cartridges 50 in the image forming apparatus 1 may not necessarily be limited to four but may be one, two, three, five or more. In this regard, a number of the openings 741 in the joint cam 74 and a number of the body-side couplings 71 may be one, two, three, five, or more, equally to the number of the process cartridge(s) 50.

What is claimed is:

1. An image forming apparatus, comprising:

a cartridge having a cartridge-side coupling;

a main body configured to have the cartridge detachably attached thereto, the main body having:

a body-side coupling movable between a connecting position, at which the body-side coupling is connected with the cartridge-side coupling, and a separated position, at which the body-side coupling is separated from the cartridge-side coupling;

a joint cam movable between a first position, at which the joint cam locates the body-side coupling at the connecting position, and a second position, at which the joint cam locates the body-side coupling at the separated position; and a rotator configured to receive a driving force from a motor, the rotator having a dent, the dent allowing entry of an end portion of the joint cam there-into when the joint cam is located at the first position.

2. The image forming apparatus according to claim 1, wherein the rotator is a double gear having a first gear and a second gear, and wherein the dent is located between the first gear and the second gear.

3. The image forming apparatus according to claim 1, wherein the rotator has a metal-made rotation shaft extending along a rotation axis thereof.

4. The image forming apparatus according to claim 1, wherein the main body has a cover covering the rotator, and wherein the cover has a restrictive rib engaged with the rotator, the restrictive rib being configured to restrict the rotator from moving in a direction of a rotation axis.

5. The image forming apparatus according to claim 1, wherein the rotator is a fuser gear configured to transmit the driving force to a fuser, the fuser being configured to fix a toner image onto a sheet.

6. The image forming apparatus according to claim 5, wherein the rotator has a first part formed of a first material and a second part formed of a second material different from the first material, wherein the first material is heat-resistant resin, and wherein the first part is located closer than the second part to the fuser.

7. The image forming apparatus according to claim 1, wherein the main body has:

an operable cam movable between an operable position, at which the operable cam acts on the cartridge, and an inoperable position, at which the operable cam dose not act on the cartridge, and a link configured to couple the operable cam with the joint cam, wherein the joint cam has a rail configured to slidably guide a boss provided to the link, and wherein, when the joint cam is located at the first position, an end portion of the rail is located in the dent of the rotator.

8. The image forming apparatus according to claim 7, wherein an upper end of the rail is located to be lower than a rotation axis of the rotator.

9. The image forming apparatus according to claim 7, wherein the boss in the link is movable between a lower position, at which the boss is located when the joint cam is located at the first position, and an upper position, at which the boss is located when the joint cam is located at a third position between the first position and the second position, the upper position being higher than the lower position, and wherein the boss located at the lower position does not interfere with the rotator.

10. The image forming apparatus according to claim 7, further comprising:

an openable/closable cover movable between a closed position, at which the openable/closable cover covers the main body, and an open position, at which the openable/closable cover uncovers the main body;

a pivotable piece configured to drive the joint cam, the pivotable piece being pivotable between a first pivot position, at which the pivotable piece locates the joint cam at the first position, and a second pivot position, at which the pivotable piece locates the joint cam at the second position, wherein the pivotable piece has an avoidable form, the avoidable form being configured to restrain the pivotable piece from interfering with the link in a process where the pivotable piece pivots from the first pivot position to the second pivot position.

11. The image forming apparatus according to claim 10, further comprising:

a pressure applier configured to move along with the openable/closable cover, the pressure applier being configured to contact the pivotable piece when the openable/closable cover moves from the closed position to the open position and press the pivotable piece in a direction to pivot from the first pivot position toward the second pivot position, and a profile member, in which a profile to define a movable path for the pressure applier is formed, wherein the pivotable piece includes:

a first contact position, at which the pressure applier contacts the pivotable piece when the openable/closable cover is located at the closed position;

a second contact position, at which the pressure applier contacts the pivotable piece when the openable/closable cover is located at an intermediate position between the closed position and the open position; and a third contact position, at which the pressure applier contacts the pivotable piece when the openable/closable cover is located at the open position, wherein the pivotable piece is located at the first pivot position when the pressure applier contacts the pivotable piece at the first contact position and located at the second pivot position when the pressure applier contacts the pivotable piece at one of the second contact position and the third contact position, wherein the pressure applier is configured to, in a process where the openable/closable cover moves from the closed position to the intermediate position, move along the profile while maintaining contact with a first range from the first contact position to the second contact position in the pivotable piece and, in a process where the openable/closable cover moves from the intermediate position to the open position, move along the profile while maintaining contact with a second range from the second contact position to the third contact position in the pivotable piece, and wherein the avoidable form is formed in the second range in the pivotable piece.

12. The image forming apparatus according to claim 1, wherein the body-side coupling is movable in directions to be closer to and farther from the cartridge-side coupling along an axial direction, the body-side coupling has a joint engageable with the cartridge-side coupling and a flange arranged coaxially with the joint, wherein the joint cam has an opening, the opening including a first opening, in which the joint of the body-side coupling at the separated position is located, and a second opening, in which the joint of the body-side coupling at the connecting position is located, the second opening being formed continuously with the first opening, wherein the second opening has a first edge extending in a movable direction of the joint cam and a second edge facing the first edge, the second edge extending in the movable direction, and wherein a distance between the first edge and the second edge in a direction intersecting orthogonally with the movable direction is smaller than a sum of a radius of the joint and a radius of the flange throughout entire extending range of the first edge and the second edge.

13. The image forming apparatus according to claim 12, wherein the first edge and the second edge of the second opening are formed linearly to extend in the movable direction.

14. The image forming apparatus according to claim 13, wherein the joint cam includes a plurality of openings, each of which is the opening, the opening having a slanting rib protruding from a circumferential edge of the first opening in the axial direction of the body-side coupling, the slanting rib being configured to contact the flange and move the body-side coupling between the connecting position and the separated position when the joint cam moves between the first position and the second position, wherein the slanting rib includes:

a first slanting rib located on the circumferential edge of the first opening on one side in the direction intersecting orthogonally with the movable direction, the first slanting rib extending in the movable direction, and a second slanting rib located on the circumferential edge of the first opening on the other side in the direction intersecting orthogonally with the movable direction, the second slanting rib extending in the movable direction, wherein a gap is formed between an end of the first slanting rib of one of adjoining openings among the plurality of openings on a side adjacent to the second opening of the other of the adjoining openings and an end of the second slanting rib of the one of the adjoining openings on the side adjacent to the second opening of the other of the adjoining openings.

15. The image forming apparatus according to claim 12, wherein the first edge and the second edge of the second opening are located to face each other in a vertical direction, wherein the second edge is located to be lower than the first edge, and wherein the second edge is formed to be shorter than the first edge in the movable direction.

16. The image forming apparatus according to claim 12, wherein the cartridge includes a developing cartridge having:

a photosensitive drum; and a developing roller configured to be coupled with the cartridge-side coupling, the developing roller being movable under a condition where the body-side coupling is located at the connecting position between a contact position, at which the developing roller contacts the photosensitive drum, and a separate position, at which the developing roller is separated from the photosensitive drum, and wherein the second opening has a retracted edge, the retracted edge having a form not to interfere with the joint of the body-side coupling when the developing roller moves to the separate position.

17. The image forming apparatus according to claim 16, wherein the joint located in the second opening is movable between:

a third position, at which the joint is located when the developing roller is located at the contact position; and a fourth position, at which the joint is located when the developing roller is located at the separate position, wherein the fourth position is located toward the first edge in the direction intersecting orthogonally with the movable direction on a side opposite to the first opening in the movable direction with respect to the third position, wherein an end of the first edge on a side opposite to the first opening and an end of the second edge on a side opposite to the first opening are connected through a third edge, the third edge having:

a first arc edge rounded along an outer circumferential surface of the joint located at the third position;

a second arc edge rounded along the outer circumferential surface of the joint located at the fourth position; and a linear edge located between the first arc edge and the second arc edge, the linear edge extending in a direction of a tangent to the first arc edge and the second arc edge.

18. The image forming apparatus according to claim 12, wherein the first opening has a third edge formed linearly to extend in the movable direction and a fourth edge located to face the third edge in the direction intersecting orthogonally with the movable direction, the fourth edge being formed linearly to extend in the movable direction, wherein the opening has a first connecting edge connecting the first edge and the third edge and a second connecting edge connecting the second edge and the fourth edge, wherein the distance between the first edge and the second edge in the direction intersecting orthogonally with the movable direction is greater than a distance between the third edge and the fourth edge in the direction intersecting orthogonally with the movable direction, and wherein the first connecting edge and the second connecting edge are slanting edges slanting at obtuse angles with respect to the movable direction.

19. An image forming apparatus, comprising:

a cartridge;

a main body configured to have the cartridge detachably attached thereto, the main body having:

a joint cam movable between a first position and a second position where the joint cam moves from the first position; and a rotator configured to receive a driving force from a motor, the rotator having a dent, the dent allowing entry of an end portion of the joint cam there-into when the joint cam is located at the first position.

20. The image forming apparatus according to claim 19, wherein the rotator is a double gear having a first gear and a second gear, and the dent is located between the first gear and the second gear.

* * * * *